(12) United States Patent
Napadensky

(10) Patent No.: US 9,662,836 B2
(45) Date of Patent: May 30, 2017

(54) METHOD FOR PRINTING OF THREE-DIMENSIONAL OBJECTS

(71) Applicant: STRATASYS LTD., Rehovot (IL)

(72) Inventor: Eduardo Napadensky, Netanya (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 14/696,858

(22) Filed: Apr. 27, 2015

(65) Prior Publication Data

US 2015/0224709 A1 Aug. 13, 2015

Related U.S. Application Data

(60) Continuation of application No. 14/165,653, filed on Jan. 28, 2014, now Pat. No. 9,017,589, which is a continuation of application No. 13/159,444, filed on Jun. 14, 2011, now Pat. No. 8,636,494, which is a continuation of application No. 11/980,807, filed on Oct. 31, 2007, now Pat. No. 7,658,976, which is a division of application No. 10/537,458, filed as application No. PCT/IL03/01024 on Dec. 3, 2003, now abandoned.

(Continued)

(51) Int. Cl.
| | |
|---|---|
| *B29C 67/00* | (2017.01) |
| *B29C 41/02* | (2006.01) |
| *B29C 41/48* | (2006.01) |
| *B29C 41/52* | (2006.01) |
| *B29C 47/92* | (2006.01) |
| *B33Y 10/00* | (2015.01) |
| *B29C 37/00* | (2006.01) |
| *B41M 3/16* | (2006.01) |
| *B29L 9/00* | (2006.01) |

(52) U.S. Cl.
CPC ......... *B29C 67/0055* (2013.01); *B29C 41/02* (2013.01); *B29C 41/48* (2013.01); *B29C 41/52* (2013.01); *B29C 47/92* (2013.01); *B29C 67/0059* (2013.01); *B29C 67/0092* (2013.01); *B29C 37/005* (2013.01); *B29C 67/007* (2013.01); *B29C 67/0051* (2013.01); *B29C 67/0062* (2013.01); *B29C 67/0066* (2013.01); *B29C 2947/92209* (2013.01); *B29C 2947/92704* (2013.01); *B29L 2009/00* (2013.01); *B33Y 10/00* (2014.12); *B41M 3/16* (2013.01)

(58) Field of Classification Search
CPC ........... B29C 67/0051; B29C 67/0055; B29C 67/0059; B29C 67/0062; B29C 67/0066; B29C 67/007; B29C 2947/92209; B29C 2947/92704; B33Y 10/00
USPC ............... 264/308; 425/143, 446, 375, 174.4
See application file for complete search history.

(56) References Cited

U.S. PATENT DOCUMENTS

| | | | | |
|---|---|---|---|---|
| 5,866,058 | A * | 2/1999 | Batchelder | B29C 67/0055 264/237 |
| 6,193,923 | B1 * | 2/2001 | Leyden | B29C 41/12 264/308 |
| 2003/0083771 | A1 * | 5/2003 | Schmidt | B29C 67/0059 700/119 |

* cited by examiner

*Primary Examiner* — Alison L Hindenlang
*Assistant Examiner* — Lawrence D Hohenbrink, Jr.
(74) *Attorney, Agent, or Firm* — Pearl Cohen Zedek Latzer Baratz LLP

(57) ABSTRACT

A method for forming three-dimensional objects is disclosed. The method includes printing building material, layer by layer, to form a three dimensional object by depositing building material in layers onto a printing tray to form a three dimensional object and maintaining the upper- (Continued)

most layers being deposited in a flowable state by a temperature control after layers below the uppermost layers are solidified.

4 Claims, 10 Drawing Sheets

Related U.S. Application Data

(60) Provisional application No. 60/430,362, filed on Dec. 3, 2002.

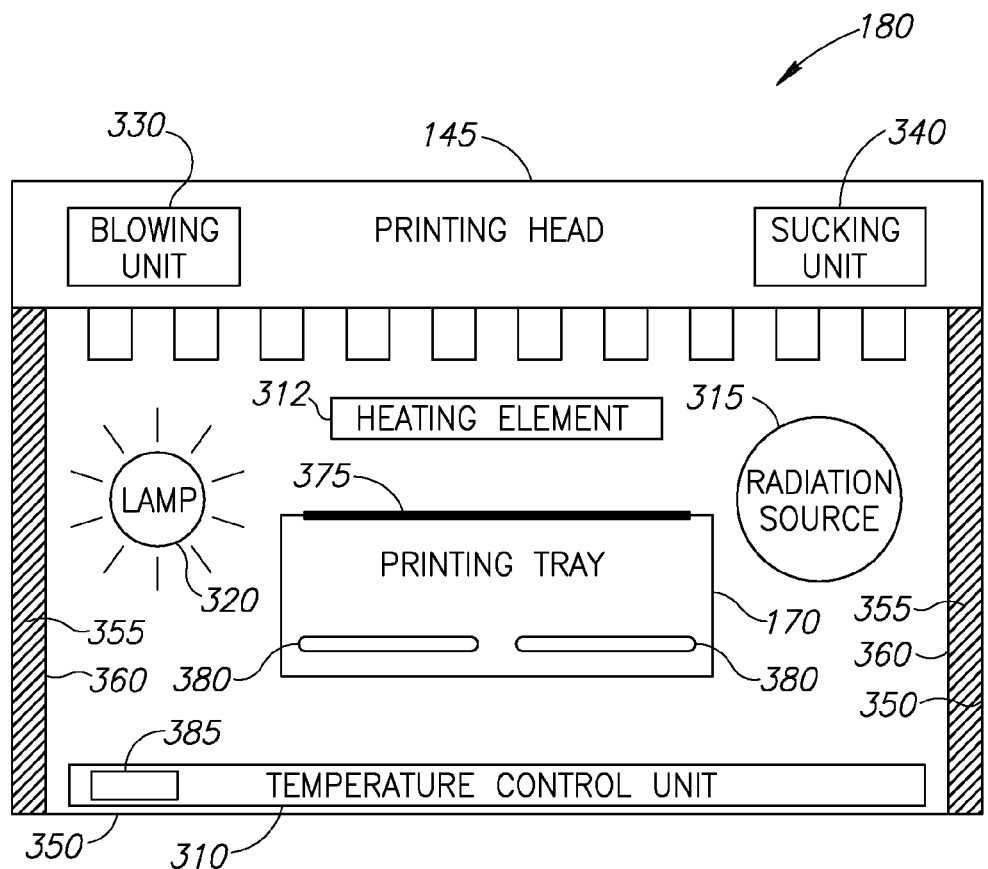
FIG.3A
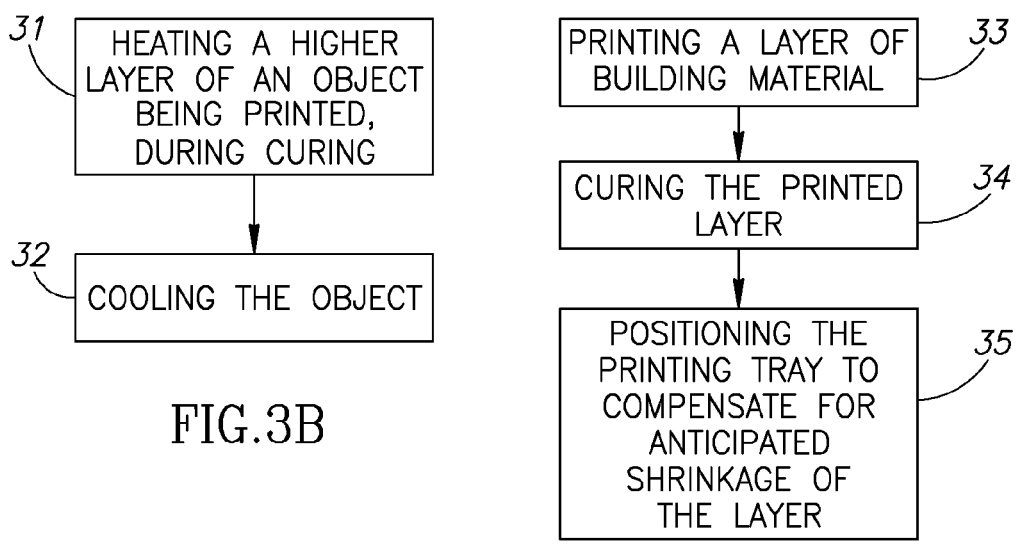
FIG.3B
FIG.3C

METHOD FOR PRINTING OF THREE-DIMENSIONAL OBJECTS

CROSS-REFERENCE TO RELATED APPLICATIONS

This application is a continuation application of U.S. patent application Ser. No. 14/165,653 filed Jan. 28, 2014, which will be issued as U.S. Pat. No. 9,017,589, which in turn is a continuation application of U.S. patent application Ser. No. 13/159,444 filed Jun. 14, 2011, issued as U.S. Pat. No. 8,636,494, which in turn is a continuation application of U.S. patent application Ser. No. 11/980,807 filed Oct. 31, 2007, issued as U.S. Pat. No. 7,958,841, which in turn is a Divisional application of U.S. patent application Ser. No. 10/537,458, filed Jun. 3, 2005, now abandoned, which is a National Phase application of PCT International application No. PCT/IL2003/001024, International Filing Date Dec. 3, 2003, which in turn claims benefit of U.S. Provisional patent application, 60/430,362, filed Dec. 3, 2002, which are all incorporated by reference herein in their entirety.

FIELD OF THE INVENTION

The present invention relates to apparatuses and methods useful in three-dimensional object printing. Specifically, embodiments of the present invention relate to systems, methods, and apparatuses for helping to improve the quality of printed three-dimensional objects.

BACKGROUND OF THE INVENTION

Three-dimensional (3D) printing is a process used for the printing of three-dimensional objects, for example by printing or building parts of such objects in layers. Such 3D objects may be used, for example, for prototype parts.

Various systems have been developed for three-dimensional printing, wherein material for object printing is deposited in consecutive layers according to a predetermined configuration or in selected arrays as defined by, for example, a Computer Aided Design (CAD) system connected to the printing systems. Such materials may include materials for constructing an object and materials used for constructing support structures for an object.

According to some apparatuses, systems and methods for 3-D printing, predetermined or preprogrammed configurations and designs using, for example, CAD software, may aim at obtaining as accurate a final product as possible. However, each printed product or model is different, whether in shape, design, size, bulk, composition and so on, and these differences may be affected by different factors during the printing process, such as heat, chemical reactions of the photopolymer material to curing, internal strains (e.g., within the object) due to strains such as, for example shrinkage of the materials during curing and/or cooling, environmental influences within the printing apparatus, for example temperature fluctuations etc. Adverse effects may take on different forms such as various deformations in the finished product. In addition, the quality of the finished product may be affected by these and other factors.

SUMMARY

Embodiments of the present invention provide apparatuses and methods for controlling the quality of printing in three-dimensional object-printing systems. A printing system, according to some embodiments of the present invention, may include a printing apparatus to print three-dimensional objects; a controller that may prepare the digital data that characterizes the 3-D object for printing, and control the operation of the printing apparatus; and a printing tray with a selected adhesion characteristic. The adhesion characteristic may be, for example, a high adhesion coating for high adhesion to the object's building material(s). The surface coating of the tray may be, for example, an anodized aluminum coating, which may include, for example, pores containing a material that acts to adhere to the printed objects. The pores may, for example, be filled with water. Alternatively, the printing tray may be pretreated with water.

According to some embodiments of the present invention the printing system may include a printing apparatus to print three-dimensional objects; a controller programmed to control the printing apparatus; and a printing tray with a thermal expansion coefficient similar to that of an object to be built. The printing tray may include organic material and/or may include material whose thermal expansion coefficient may be substantially similar to that of the objects being printed.

According to some embodiments of the present invention, a printing apparatus for three-dimensional printing may be provided that may include a printing head (e.g., an ink jet head or another suitable material deposit system or dispenser) to deposit material for a three-dimensional object; a printing tray to support the objects being printed by the apparatus; and a temperature control unit to control the temperature in the apparatus. The temperature control unit may include, for example, a heating source or mechanism and a cooling source or mechanism. The temperature control unit may be integrated into the printing tray. For example, the printing tray may include cooling tunnels and/or heating elements and/or temperature sensors.

According to some embodiments of the present invention a printing apparatus for three-dimensional printing may include a printing head, a printing tray, and a blowing unit to cool layers of an object after printing. In other embodiments such a printing apparatus may include a sucking unit to cool layers of an object after printing.

According to some embodiments of the present invention the printing apparatus for three-dimensional printing may include a printing sub-system or other suitable container which may be insulated for, for example, temperature control. The cell may include a temperature control unit. The temperature control unit may include a heating source or mechanism and/or a cooling source or mechanism. Heating of the cell, for example, may be brought about by the tray, which may be heated by heating elements. The printing sub-system may include material that may be reflective in the IR wavelength region. The printing sub-system may include at least one insulation structure. The printing sub-system may include an upper heating element, radiation source, lamp, or other suitable heat source, to control the temperature of the printing sub-system and/or heat the upper layers of an object being printed.

According to some embodiments of the present invention, the printing apparatus may include a printing sub-system and an insulation area to insulate an object or set of objects whose printing may be complete. The insulation area may include a temperature control unit. The printing apparatus may include at least two printing trays.

According to some embodiments of the present invention a three-dimensional printing system may include a printing nozzle detector mechanism. Nozzle status data detected by the nozzle detector mechanism may be computed and/or analyzed by a controller, for example, using suitable executable code.

According to some embodiments of the present invention the printing system may include one or more leveling devices associated with a printing head array.

According to some embodiments of the present invention the printing system may include a curing lamp located at a side of the printing head, and a leveling device and/or another curing lamp located at the other side of the printing head.

According to some embodiments of the present invention a printing apparatus for three-dimensional printing may include a controller to control construction of building material at the base of an object to be printed, and print the object on the construction. The controller may act to dispense building material beneath the base of said object to be printed. The construction may adhere to the object and to a printing tray on which the object is to be printed. The construction may provide a barrier layer between the object and the printing tray. The construction may provide a carpet between the object and the printing tray. The construction may provide a pedestal between the object and the printing tray. The construction may raise the object being built within the leveling range of a leveling device.

According to some embodiments of the present invention a printing apparatus for three-dimensional printing may include a controller to control the building of a thickening layer of building material of a predetermined thickness around a printed object. The thickening layer include one or more building materials.

According to some embodiments of the present invention a printing apparatus for three-dimensional printing may include a controller to position a printing tray at a relatively high level prior to printing, the level enabling compensation for shrinkage in a previously printed and cured layer.

According to some embodiments of the present invention a printing apparatus for three-dimensional printing may include a controller to control the delivery of shockwaves to a printing tray holding a printed object.

According to some embodiments of the present invention a printing apparatus for three-dimensional printing may include a controller to control the printing of a three-dimensional object with an adjacent support construction, the object and the support construction being separated by a barrier, the barrier including vacant pixels.

According to some embodiments of the present invention a printing apparatus for three-dimensional printing may include a controller to control the printing of a support construction, the support constructing including support material and modeling material elements within the support material, the modeling material elements being used to reinforce the support material. The support construction may include a grid of pillars within the support material. The grid of pillars may be in direct contact with support material, and/or with a printing tray. The controller may control constructing of at least one support construction as a body outline around a printed object.

According to some embodiments of the present invention a printing apparatus for three-dimensional printing may include a controller to detect defective nozzles, and to adjust printing coordinates to compensate for the defective nozzles. The controller may control adjustment parameters by print head shifting, print head movement, and/or input data conversion. Control of adjustment parameters may be according to a shift algorithm. The controller may enable printing a first layer of an object to be printed by a printing head having a certain reference frame; and printing a second layer of an object to be printed by said printing head, the printing head having a second reference frame that is different from the first reference frame.

According to some embodiments of the present invention a printing apparatus for three-dimensional printing may include a controller to enable moving a printing head in a forward passage when printing an object, and adjusting the height of a printing tray prior to the reverse passage of the printing head.

According to some embodiments of the present invention a printing apparatus for three-dimensional printing may include a controller to shift the step of a nozzle array, where said nozzle array includes a large nozzle step. The controller may enable printing additional layers in a first direction, and lowering the printing tray for each additional layer printed in the first direction. The controller may enable printing additional layers in a second direction, where the number of additional layers are related to the nozzle step divided by the size of the nozzle droplet stain.

According to some embodiments of the present invention a method is provided for three-dimensional object printing that includes increasing adherence of an object being printed to a printing tray, wherein the printing tray has predetermined surface characteristics. The printing tray may include an anodized layer, and may have pores that may be filled with material that attracts modeling material. The pores may be filled with water. The printing tray may be pre-treated with water.

According to some embodiments of the present invention adherence of an object being printed to a printing tray may be increased by using a printing tray that has a thermal coefficient substantially similar to that of a printed object. The printing tray may be made of organic material. The printing tray may be made from substantially similar material to a printed object.

According to some embodiments of the present invention, three-dimensional object printing methods may include printing a support construction below the base of an object to be printed, such that the construction adheres to the object and to a printing tray on which the object is to be printed. An object may subsequently be printed on the construction.

According to some embodiments of the present invention a printing method may include printing a support construction as a barrier layer between a printing tray and an object to be printed, such that the barrier layer separates the lower layers of the object to be printed from the printing tray. An object may subsequently be printed on the barrier layer.

According to some embodiments of the present invention the temperature of an object being printed may be controlled. The control may be enabled by heating a printing tray to a selected temperature during the building of the object. The object may subsequently be cooled. The selected temperature may be substantially at the glass transition point of a modeling material, or at the glass transition point of a support material. The temperature of an upper layer of material of an object being printed may be controlled, by for example a controller, for example, to a temperature above the glass phase transition of the material. Such control may be enabled using an electromagnetic radiation associated with the curing device, electromagnetic radiation independent of the curing device, exothermic chemical curing, a heating element, a cooling element, and/or other suitable temperature control elements, such as a temperature sensor and controller that operates the cooling and heating elements according to the sensor reading and required temperature. The material of the upper layer(s) may be heated before depositing.

According to some embodiments of the present invention the temperature in a printing sub-system may be controlled during a printing process, using, for example, a heating element, a cooling element, a curing unit, a radiation unit, an insulated printing sub-system, and/or other suitable temperature control elements. The cooling of the printing sub-system may be controlled. The printing tray may be moved to an insulation area, which may be, for example, within the printing sub-system or outside of the printing sub-system. The insulation area may include a removable structure.

According to some embodiments of the present invention a three-dimensional object printing method may include printing a "thickening" layer comprised of a support structure of a predetermined thickness around a printed object. The support structure may include support material, and/or a combination of support material and modeling material either as a homogenous mixture or not. The thickening layer may be removed after printing is complete. The thickening layer may additionally help prevent the accumulation of excess material on the surfaces of the object.

According to some embodiments of the present invention, a printing method may include printing a first layer of building material, curing the first layer of material, and printing an additional layer after the first layer is cured. The printing tray may be positioned at a relative height or level that enables compensation for the shrinkage in the previously printed and cured layer.

According to some embodiments of the present invention a method of preventing mechanical deformation of a three-dimensional printed object upon removal of the printed object from the printing tray may include using a printing tray with low adhesion characteristics.

According to some embodiments of the present invention a method of preventing mechanical deformation of a three-dimensional printed object upon removal of the printed object from the printing tray may include exposing the printing tray to cold water or other cooling means.

According to some embodiments of the present invention a method of preventing mechanical deformation of a three-dimensional printed object upon removal of the printed object from the printing tray may include exposing the tray to shock waves.

According to some embodiments of the present invention a three-dimensional object printing method may include printing a support construction on a printing tray prior to printing an object, the support construction including one or more layers of modeling material protruding outside the boundaries of the base of the object. The modeling material may be covered with a support construction, which may protrude outside the boundaries of the object. A thin layer of modeling material may be deposited over the support material. The support construction may include a combination of modeling material and support material. The support construction may include one or more pillars of modeling material interspersed with support material.

According to some embodiments of the present invention a three-dimensional object printing method may include printing a three-dimensional object with an adjacent support construction separated from the object by a barrier. The barrier may include at least one set of vacant pixels that may allow for the spread of modeling and support materials into the vacant pixel barrier and thus reduce the mixing of the materials of each construction.

According to some embodiments of the present invention a three-dimensional printing method may include printing a support construction that includes support material and modeling material elements within the support material, to reinforce the support material. The support construction may include a grid of pillars within the support material. The pillars may be larger and/or more closely spaced at the outer periphery of the support construction. A wall of modeling material may be constructed surrounding the support construction. The support material may be, for example, interspersed with modeling material elements. A continuous phase of support material may be reinforced by model material in the form of, for example, columns, membranes, and/or cubes. The support construction may be dispensed as, for example, a body outline around a printed object.

According to some embodiments of the present invention a three-dimensional object printing method may include constructing a support construction on the printing tray; and printing an object on top of the support construction, such that the object may be built within the leveling range of a leveling device associated with the printing apparatus.

According to some embodiments of the present invention a three-dimensional object printing method is provided that includes detecting problematic nozzles, and adjusting printing coordinates to compensate for the problematic nozzles. The adjustment may include controlling print head shifting in Y (e.g., the non printing direction), input data conversion, and/or other suitable adjustment parameters. A shift algorithm may be used to adjust a printing head.

According to some embodiments of the present invention a method for higher 3-D printing resolution in the Y-direction, than may be set forth by the droplet diameter may include printing a first layer of an object to be printed, interlacing, and printing a second layer of an object to be printed over said first layer. Each of the layers may include a portion of required pixels. The first layer and second layer have different height values. A third layer may be constructed over the second layer. A shift algorithm may be used to perform the interlacing.

According to some embodiments of the present invention a method for 3-D printing may include adjusting the height of a printing tray prior to the reverse passage of a printing head printing an object on the printing tray, subsequently printing the reverse passage by the printing head. The printing tray height may be adjusted.

According to some embodiments of the present invention, the step of a nozzle array may be shifted, in the case, for example, where said nozzle array has a large nozzle step. The shifting may include printing additional layers in the X direction, and lowering the printing tray for each additional X direction layer printed. The method may include printing additional layers in the Y direction, such that the number of additional layers are related to the nozzle step divided by the size of the nozzle droplet stain.

BRIEF DESCRIPTION OF THE DRAWINGS

The principles and operation of the system, apparatus, and method according to the present invention may be better understood with reference to the drawings, and the following description, it being understood that these drawings are given for illustrative purposes only and are not meant to be limiting, wherein:

FIG. 3A is a schematic illustration of a printing subsystem, according to some embodiments of the present invention;

FIGS. 3B-3C are flow chart illustrations of exemplary methods of printing, according to an embodiment of the present invention;

Figure 1:
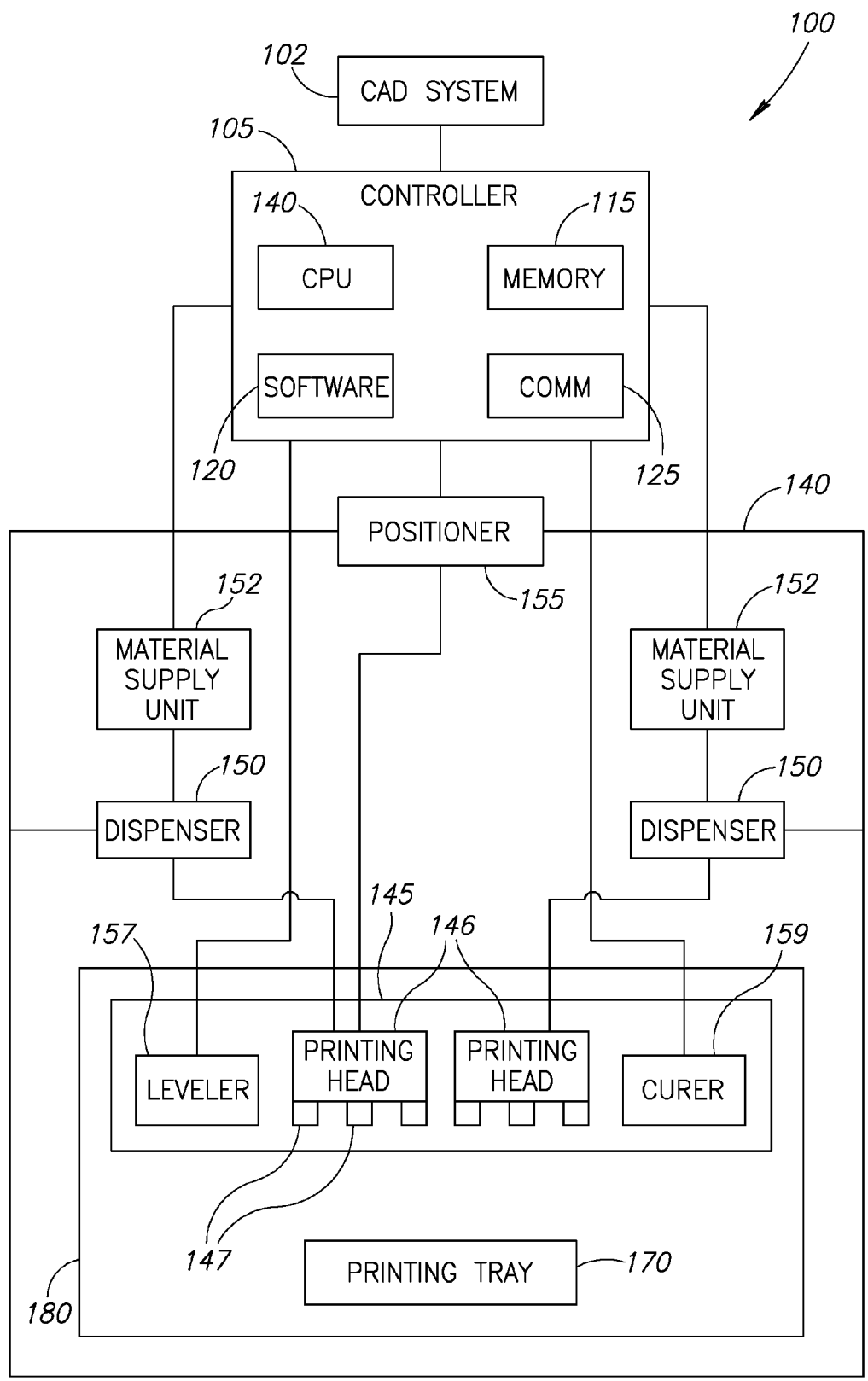
FIG. 1 is a block diagram of a 3D printer system according to some embodiments of the present invention.

It will be appreciated that for simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

It is noted that the term "building material" as used herein may include model or "modeling" material, support material, mixed material, and/or any suitable combination of materials used in the building, forming, modeling, printing or other construction of three-dimensional (3D) objects or models. Building material may include material used to create objects, material used to modify such material (e.g., dyes, fillers, etc), support material, or other material used in the creation of objects, whether or not appearing in the final object. The terms "structure" or "construction" as used herein may include different types and/or combinations of building materials. For example, support constructions may include pillars built from modeling material surrounded by support material. A construction including a single, homogenous material may also be regarded as a structure or construction according to embodiments of the present invention. The term "object" as used herein may include a structure or model desired to be built. Such a structure may, for example, include modeling material alone or modeling material with support material. The terms "support" or "support construction" as used herein may include all structures that are constructed outside the area of the object itself. The terms "layer" or "slice" as used herein may include portions of an object and/or accompanying support structures optionally laid one above the other in Z direction. The word layer may also be used to describe a three-dimensional envelope or skin.

The printing system and system components according to embodiments of the present invention may be similar to and use or be based on aspects of embodiments described in U.S. Pat. No. 6,259,962, issued Mar. 1, 1999, titled "APPARATUS AND METHOD FOR THREE DIMENSIONAL MODEL PRINTING"; U.S. Pat. No. 6,569,373, issued May 27, 2003, titled "COMPOSITIONS AND METHODS FOR USE IN THREE DIMENSIONAL MODEL PRINTING", U.S. Pat. No. 6,658,314, issued Dec. 2, 2003, titled "SYSTEM AND METHOD FOR THREE DIMENSIONAL MODEL PRINTING"; and U.S. Pat. No. 6,850,334, issued Feb. 1, 2005, titled "SYSTEM AND METHOD FOR THREE DIMENSIONAL MODE", as well as U.S. patent application Ser. No. 10/424,732, filed Apr. 29, 2003, Publication No. 2003/0207959, published on Nov. 6, 2003 titled "COMPOSITIONS AND METHODS FOR USE IN THREE DIMENSIONAL MODEL PRINTING"; Ser. No. 10/101,089, filed Mar. 20, 2002, Publication No. 2002-0171177, published on Nov. 21, 2002, titled "SYSTEM AND METHOD FOR PRINTING AND SUPPORTING THREE DIMENSIONAL OBJECTS"; and/or Ser. No. 10/336,032, filed Jan. 3, 2003, titled "DEVICE, SYSTEM AND METHOD FOR ACCURATE PRINTING OF THREE DIMENSIONAL OBJECTS", all assigned to the common assignee of the present invention and fully incorporated herein by reference. However, the printer system according to some embodiments of the present invention may also have other configurations and/or other methods of operation. For example, the printer system according to the present invention may include more than one printing head, and/or more than one material dispenser, positioner, curer, imager, illuminator, leveler, sensor, cartridge, cartridge valve, etc. In further embodiments, layer-by-layer deposition need not be used, and other curing or solidifying methods may be used. The printing head may include, for example, an ink jet head or another suitable material deposit system or dispenser.

According to various embodiments of the present invention, the materials that may be used may be similar to the materials described in the aforementioned US patent and US patent applications. For example, photopolymer materials curable by the application of electromagnetic radiation or other materials suitable for 3-D object construction may be used. The photopolymer material may be of various types, including, for example, a photopolymer modeling material which may solidify to form a solid layer of material upon curing, and a photopolymer support material which may solidify, wholly or partially, or not solidify upon curing, to provide a viscous material, a soft gel-like or paste-like form, and/or a semi-solid form, for example, that may be easily removed subsequent to printing. The various types of photopolymer material may be dispensed separately or in any given combination, according to the hardness and/or elasticity of the object desired to be formed or any of its parts, or the support constructions required to provide object support during construction. Materials other than those described in the above patents and applications may be used.

The 3-D object being printed may consist predominantly of modeling material and may or may not be combined with support material, in varying ratios and combinations, according to the strength, elasticity or appearance desired for the finished printed object. Such combination of materials used for the building of the object or model itself is termed the "modeling construction".

"Support constructions", on the other hand, may consist predominantly of support material, which may or may not be combined with building material in varying ratios and combinations according to the desired strength, elasticity and so on of the support construction. Support constructions may be printed adjacent and/or around part/s or all of the modeling construction's according to the purpose which the support construction's are to serve.

A third type of construction that may be printed is the "release" construction, which may consist predominantly of support material (optionally with a relatively small element of modeling material). Release constructions may not solidify or may solidify partially to form a relatively soft layer or layers of material, to enable easy release from a printed object. For example, the release layer may be a viscous liquid material, paste-like material, gel-like material and/or semi-solid material etc., according to the requirements of the object and the purpose which the release layer may be to serve in the printing process.

U.S. Pat. No. 6,259,962 assigned to the assignee of the present application and incorporated herein by reference, describes, inter alia, embodiments including an apparatus and method for 3-D object printing. The apparatus may include, for example, a printing head, for example an ink-jet type printing head, having a plurality of nozzles through which building materials are dispensed, and a dispenser connected to the printing head for selectively dispensing material in layers onto a printing tray. The printing head may draw material from a reservoir containing the material. The reservoir may be connected to the printing head, and may supply the material via a tube or tubes to the printing head. A common type of reservoir may consist of a container, such as a cartridge, containing building material. Other types of reservoirs and feed systems may be used. The apparatus may further include an electromagnetic radiation mechanism for optionally curing each of the layers of material deposited. The location of depositing, and the amount and/or type of material to be deposited may be controlled by the apparatus' controller as preprogrammed from a 3-D data file. The depth of each deposited layer may be controlled by selectively adjusting the output from each of the plurality of nozzles.

The building materials used in the process of construction of 3-D objects according to some embodiments of the present invention are described in U.S. Pat. No. 6,658,314 and further in U.S. Pat. No. 6,569,373, both assigned to the current assignee, and both of which are incorporated herein by reference. Briefly, in one embodiment there are two main types of building materials used: "modeling material" or "model material", being the first building material substantially as described in the aforementioned patent applications assigned to the current assignee, and "support material", being the second building material substantially as described in the aforementioned patent applications assigned to the current assignee. Of course, other materials, other numbers of materials and other combinations of materials may be used.

As described in US Patent Application Publication No. 2002/0171177 incorporated herein by reference, a relatively solid support structure may be formed using modeling material, for example in the form of narrow vertical pillars joined by horizontal membranes, around, between, and/or within which support material may be dispensed. The support structure, when cured, may provide a semi-solid support construction for the 3-D object being built. Support material may be dispensed alone and may remain uncured for various purposes, for example, to form layers of 'release' between the solidified object and its semi-solid support constructions for easy separation of the two types of construction after printing is complete.

U.S. Pat. No. 6,850,334, assigned to the current assignee and incorporated herein by reference, includes for example an embodiment having an apparatus in the form of a leveling device which may follow in the path of the apparatus' printing head. This leveling device may serve to straighten the most recently laid layer of materials before curing, thereby narrowing each layer to its desired depth and ensuring consistent 'spread' of the materials within the layer, in preparation for the deposit of the next layer of materials. Excess interface material gathered en route by the leveling device may be cleaned off the leveling device and disposed of after separate curing.

The various constructions comprising each layer (e.g., modeling, support and/or release, as required) may be deposited in the same passage of the printing head in the X-Y axes, according to, for example, a predetermined CAD configuration which may be converted, for example, to a Stereo Lithography (STL) format, and programmed into an apparatus control unit. The CAD configuration may determine, for example, the amount of building material, the type of building material and various combinations of materials to be jetted from the nozzles, and may determine from which nozzle and at which points building material may be jetted from each nozzle during the course of deposit of a single layer of materials. Other data formats may be used.

When printing, the printing head may move in the X-Y direction, depositing the materials in the course of its passage over the printing tray or printing area, in a predetermined configuration. This forward passage of the printing head may be followed by curing of the deposited material by a source of electromagnetic radiation. In the reverse passage of the printing head, back to its starting point for the layer just deposited (point 0 on the X-Y axes), an additional deposition of materials may be carried out, according to predetermined configuration. In the reverse passage of the printing head, the second part of the layer thus laid may be straightened by a leveling device, for example, a roller or blade, which may, for example, follow in the path of the printing head in its reverse movement, and then the thus straightened layer may be cured by means of electromagnetic radiation. Since the movement of the leveling device may follow the reverse route of the printing head, the first part of the layer deposited in the printing head's forward movement may be thicker than the second part of the layer deposited in the printing head's reverse movement. CAD configuration of the final depth or height of each layer, for example, may take into account the final desired thickness of each single layer after forward and reverse movements of the printing head at each height of the printing apparatus on the Z axis. Other movement, curing, and leveling sequences may be used. For example, a leveling procedure may be performed at other times.

Once the printing head has returned to the 0 position (starting point) in the X-Y axes, the printing tray may be lowered in the Z axis to a predetermined height, according to the desired thickness of the layer subsequently to be printed, and the printing head once again may begin its movement in the X-Y axes as predetermined. The tray need not be lowered. The starting position of the printing head may be adjusted in the Y axis, for example, for further printing in the X axis at the same Z height as the previously deposited layer.

As described above, adverse effects in printed objects may take on different forms, for example, various deformations and/or defects in the finished product. According to some embodiments of the present invention, methods and apparatuses may be provided that may help in improving the quality, strength, appearance, and/or 'finish' of the final product. For example, these apparatuses and methods may help in preventing deformation of 3-D printed objects, aiding construction using support materials, and improving accuracy of printed 3-D objects, as are described in detail below.

FIG. 1 is a block diagram of a 3D printer system 100 according to an exemplary embodiment of the present invention. 3D printer system 100 may include, for example, a CAD module 102 or other design module, controller 105, and printing apparatus 140.

Controller 105, which may prepare the digital data that characterizes a 3-D object for printing, and control the operation of the printing apparatus, may include, for example, a processor 110, a memory unit 115, software code 120, and a communications unit 125. Other configurations may be used for a controller or control unit. Control functionality may be spread across units, and not all control functionality may be within system 100. For example, a separate unit, such as a personal computer or workstation, or a processing unit within a supply source such as a cartridge may provide some control or data storage capability. Communications unit 125 may, for example, enable transfer of data and instructions between controller 105 and CAD module 102, between controller 105 and printing apparatus 140, and/or between controller 105 and other system elements. Controller 105 may be suitably coupled and/or connected to various components of printing apparatus 140.

Printing apparatus 140 may include for example positioner(s) 155, material dispenser(s) 150, material supply unit(s) 152, and printing sub-system 180. Printing sub-system 180 may include a printing box 145, and a printing tray 170. Printing box 145 may include printing head(s) 146, printing nozzle(s) 147, leveler(s) 157, curer(s) 159, and other suitable components. Positioner 155, or other suitable movement devices, may control the movement of printing head 145. Leveler or leveling device 157 may include, for example, a roller or blade or other suitable leveling mechanism. Printing head 145 may be, for example, an ink jet head or other suitable printing head.

Controller 105 may utilize Computer Object Data (COD) representing an object or a model, for example, CAD data in STL format. Other data types or formats may be used. Controller 105 may convert such data to instructions for the various units within 3D printer system 100 to print a 3D object. Controller 105 may be located inside printing apparatus 140 or outside of printing apparatus 140. Controller 105 may be located outside of printing system 100 and may communicate with printing system 100, for example, over a wire and/or using wireless communications. In some embodiments, controller 105 may include a CAD system or other suitable design system. In alternate embodiments, controller 105 may be partially external to 3D printer system 100. For example, an external control or processing unit (e.g., a personal computer, workstation, computing platform, or other processing device) may provide some or all of the printing system control capability.

In some embodiments, a printing file or other collection of print data may be prepared and/or provided and/or programmed, for example, by a computing platform connected to 3D printer system 100. The printing file may be used to determine, for example, the order and configuration of deposition of building material via, for example, movement of and activation and/or non-activation of one or more nozzles 147 of printing head 145, according to the 3D object to be built.

Controller 105 may be implemented using any suitable combination of hardware and/or software. In some embodiments, controller 105 may include, for example, a processor 110, a memory 115, and software or operating instructions 120. Processor 110 may include conventional devices, such as a Central Processing Unit (CPU), a microprocessor, a "computer on a chip", a micro controller, etc. Memory 115 may include conventional devices such as Random Access Memory (RAM), Read-Only Memory (ROM), or other storage devices, and may include mass storage, such as a CD-ROM or a hard disk. Controller 105 may be included within, or may include, a computing device such as a personal computer, a desktop computer, a mobile computer, a laptop computer, a server computer, or workstation (and thus part or all of the functionality of controller 105 may be external to 3D printer system 100). Controller 105 may be of other configurations, and may include other suitable components.

According to some embodiments of the present invention, material supply unit(s) 152 may supply building materials to printing apparatus 140. Building materials may include any suitable kind of object building material, such as, for example, photopolymers, wax, powders, plastics, metals, and may include modeling material, support material and/or release material, or any alternative material types or combinations of material types. In some embodiments of the present invention, the building materials used for construction of the 3D object are in a liquid form. Such materials may be similar to those described in embodiments of U.S. Pat. Nos. 6,569,373 and 6,658,314 US Patent Publication Number 2003/0207959, all of the same Assignee, and incorporated herein by reference. In an exemplary embodiment of the present invention, the modeling and/or support materials used are photopolymers that may contain material curable by electromagnetic radiation and/or electron beams etc. The materials may come in different forms, textures, colors, etc. Other suitable materials or combinations of materials may be used.

The 3-D object printing process as described in U.S. Pat. Nos. 6,259,962, 6,658,314 and 6,569,373 and US Patent Application Publication 2002/0171177, all assigned to the current assignee and incorporated herein by reference, may include a method of printing a 3-D object on a layer-by-layer basis. For example, printing an object may include dispensing modeling and/or support materials on a layer by layer basis according to a predetermined configuration, from a plurality of nozzles on the apparatus' printing head. The building material(s) may be dispensed at a given temperature in a fluid state to form a layer, and after dispensing each layer may optionally be cured by, for example, a source of electromagnetic radiation. The building material(s) may solidify as a result of curing and subsequent cooling.

Printed 3-D objects, however, may be deformed or have defects. Factors that may contribute to such deformations and defects may include, for example, internal stress forces due to the photo-polymerization curing process, for example residual polymerization occurring after primary curing of lower layers or accumulative stress gradients within the printed object. Additionally, temperature variances between levels of layers and/or between the laid layers and the internal apparatus 'environment' may cause deformations in the printed object. Furthermore, mechanical forces, for example damage caused during removal from the printing tray, may leads to deformations of printed 3-D objects. Various embodiments of the present invention are provided to minimize deformation of a printed object during and/or after the printing process.

For example, solidification of building material(s) may cause shrinkage of parts of the object or the whole object. In addition, cooling or other temperature changes of the material after it has been dispensed and cured may cause additional shrinkage. After a number of layers have been laid, there may be a difference between the uppermost, last laid layers and the lower layers of material, both in temperature and in the extent to which the different layers have been cured. For example, the uppermost layers may be warmed by the curing radiation and by the exothermic chemical curing process that evolves. The lower layers, in contrast, may be cooler, as they may have had more time in which to cool, and may have been cooled in a colder environment as compared to the upper layers. In addition, with each passing of the printing head over the 3-D object being built, repeated irradiation of the layers beneath the uppermost layers of material may cause a difference in the extent of curing between the lower layers and the uppermost more recently laid layers. These and other differences in temperature and curing between upper and lower layers may cause stress between the various layers of the object, and may lead to a variety of deformations. Other embodiments may not experience such temperature differences or radiation differences.

One appearance of deformation that may occur is the lifting or 'curling' of the base edges of the 3-D object upwards. This phenomenon may relate, for example, to the excess of repeated UV radiation that the sides are exposed to, which may cure the sides more than the center of the object. Curling up of the edges of the base of the object may also result from the lower temperature of the sides of the object, which may shrink in relation to the center of the object. In other situations, the center of the object rather than the sides may lift, due, for example, to the stronger shrinkage of the lower layer with respect to the upper layers, as described above. Curing using methods other than UV may be used.

Another form of deformation that may occur is the sideways 'bending' of vertical walls of the printed object. The sides of the object being printed may be exposed to repeated radiation (e.g., UV radiation) and to more cooling than the center of the object. Furthermore, different sides of the printed object may be exposed to different amounts of radiation and cooling etc. These influences, for example, may cause the object to be elongated more on one side than the other, therefore causing the walls to bend.

According to some embodiments of the present invention, components and methods are provided to keep a printed object firmly adhered to the printing tray, possibly minimizing or preventing deformation of a 3-D object during and/or after printing, and/or providing other benefits.

Figure 2A:
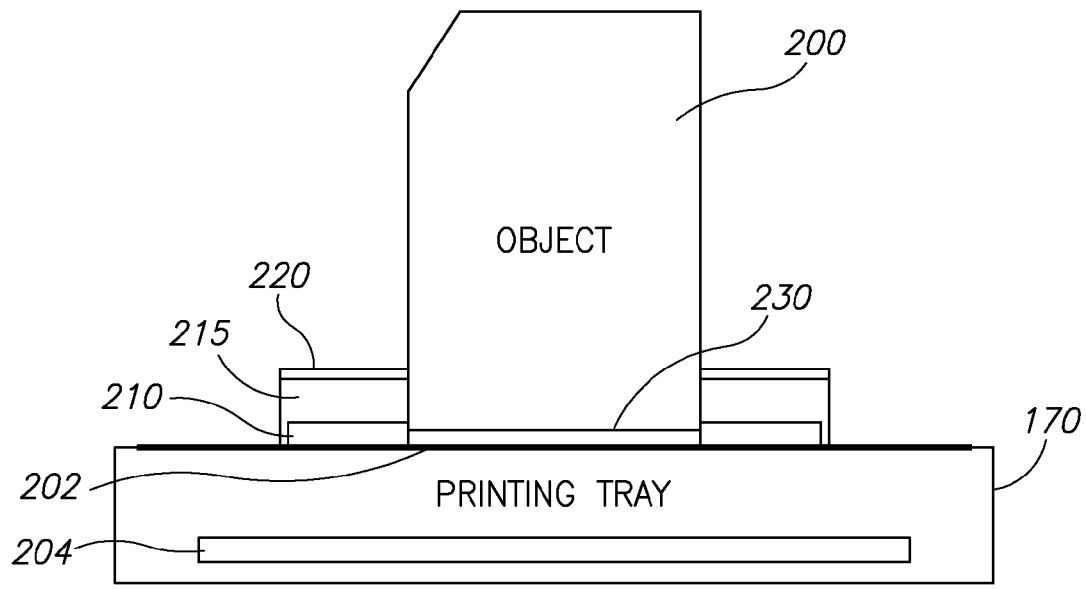
FIG. 2A is a schematic illustration of a printing tray and printing object, according to some embodiments of the present invention.

Reference is now made to FIG. 2A, which is a schematic illustration of various support layers printing elements that may be provided, according to some embodiments of the present invention. Printing tray 170 may be coated with a surface coating 202, for example, an adhesive coating or layer that has characteristics appropriate to enable high adhesion to the object's building material(s). These characteristics may be, for example, mechanical or chemical in nature. One type of surface coating 202 may include, for example, an anodized layer (e.g., coated electrolytically with a protective or decorative oxide) laid over, for example, a smooth aluminum surface. Another type of surface coating 202 may include an anodized layer with pores that are filled with modeling material or any other material that may chemically fit and attract the modeling material. An additional type of surface coating 202 may be an anodized coating with pores that are filled with water. Other suitable materials and surface constructions may be used.

According to some embodiments, printing tray 170, and optionally surface coating 202, may require frequent cleaning with, for example, water (as opposed to solvents, e.g., alcohol) to increase adherence of the building material to printing tray 170. Printing tray 170, according to some embodiments, may require pretreatment with water.

According to some embodiments of the present invention, printing apparatus 140 may provide a relatively thin membrane, appendage, or carpet 210 of building material below and/or around the base of the object being printed 200. This appendage or carpet 210 to the base of the object being printed may include, for example, one or more layers of modeling material. In cases where carpet 210 may tend to lift from tray 170, the portions of carpet 210 that protrude out of the boundaries of the base of object 200 may be coated with one or more layers of support material 215 that may protect carpet 210, for example, from additional curing, and may help keep carpet 210 flexible and adhesive in texture. In order to coat the carpet edges, one or more layers of supporting material 215 may protrude outside the carpet's circumference thereby covering the carpet. In addition, above the layers of support material 215, an additional layer or layers of modeling material 220 may be added to strengthen carpet 210 during printing. Carpet 210, which may include, for example, soft and adhesive support layers above and around it, may be effective, for example, in preventing air, radiation etc. from infiltrating between the base of object 200 and tray 170, thereby helping prevent detachment of object 200 from tray 170.

According to some embodiments of the present invention a support pedestal 230 may be provided to help ease the removal of a printed object from the printing tray and thus may help prevent deformation by manual or mechanical damage. A support pedestal may be defined as a part of the support structure that may be lower than the lowest point of the object. Support pedestal 210 may enable easy release of printed object 200 from printing tray 170, may improve an object's accuracy in the Z direction (height), and/or may improve an object's accuracy in the X-Y directions. Support pedestal 210 may be provided, for example, by printing extra support construction layers underneath the object and/or the object's adjacent support constructions. The pedestal may be, for example, a matrix of support construction layers that may be pre-configured to be printed beneath the object (e.g., between the object and the tray). Such a support matrix may be printed prior to the laying of the first layer of the 3-D object to be built, and may include support material and/or a combination of modeling, support, release and/or other materials. The supporting pedestal may be constructed from modeling materials that, for example, may not tend to lift from the tray, and therefore may not be required to be firmly attached to the tray. Such modeling materials may, for example, be characterized by being soft and of a flexible nature. Support pedestal 210 may be constructed from regular support construction, or may be more rigid and sticky so as to enhance adherence of the object to the pedestal. Such construction may be composed, for example, of densely spaced thin pillars made of modeling material with support material in-between. Other suitable pedestal constructions may be used.

Inaccuracies in Z may occur at the lowest layers of the printed object. This may be because the top surface of the tray at Z start level (the Z level of the tray when printing starts) may not be exactly at a height which enables the leveling device to reach and thus level the first layers deposited in the printing process, when the leveling device may be at its lowest point (e.g., because of inaccuracy in adjustments and/or incomplete flatness and horizon of the tray etc). As a result, the lower layers of the printed object may not be leveled by the leveling device and therefore their thickness may be greater than the designed layer thickness, therefore increasing the height of the object as printed in contrast to the object as designed. The use of a pedestal construction under the lowest point of the object may solve this problem by specifying that the height at which printing of the actual object may starts may be the height at which the pedestal itself may be significantly leveled by the leveling device.

According to an embodiment of the present invention, pedestal 210 may provide a barrier between object 200 and tray 170. Barrier layer 230 may have a structure of similar construction to the main support structure 215, but not necessarily equal to support structure 215. For example, the barrier layer may be a relatively soft layer, and may measure, for example, a few tenths of a millimeter in height. The barrier layer may have any other dimensions. The barrier layer may provide a barrier between the tray and the object, which may have dissimilar thermal coefficients, such that lower layers of printed object 200 may not be directly exposed to the surface of tray 170. The usage of soft barrier may require the object to be constructed from modeling material that does not tend to deform when not bound strongly to tray 170.

Figures 2B, 2C:
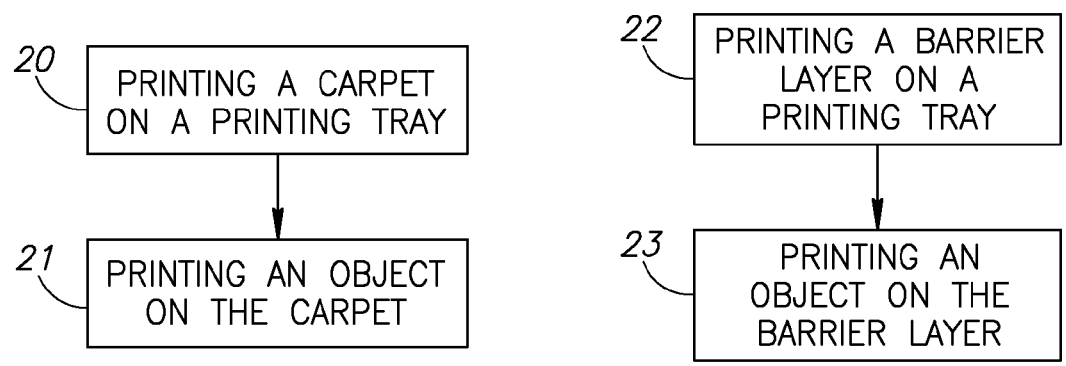
FIGS. 2B-2E are flow chart illustrations of exemplary methods of printing, according to an embodiment of the present invention.

Reference is now made to FIG. 2B, which is a flowchart illustrating a method for improved quality printing of 3-D objects, according to some embodiments of the present invention. As with all embodiments of the method of the invention discussed herein, the apparatuses discussed herein can effect the embodiments of the method. For example, a controller as discussed herein may control various aspects of a suitable printer (e.g., a movement control device, a temperature control device, print heads, etc) to effect a suitable embodiment. Furthermore, other suitable apparatuses may be used to effect various embodiments of the method. As can be seen with reference to FIG. 2B, the method may include, at block 20, printing a construction of building material, such as a carpet, below and/or around the base of the object to be printed, such that the construction may help the object to be printed adhere to the printing tray; and, at block 21, printing the object. Other steps and/or series of steps may be used. The carpet or part(s) of the carpet may be printed in the same X movement as the printing of the object and/or its support constructions, or in alternative X movements, or in Y or Z movements.

During a printing process or after printing is finished, the bottom layers of an object 200 and tray surface may cool simultaneously. In the case where the tray is made of metal and the printing materials are plastic, for example, the thermal expansion coefficient of plastic may be significantly larger than that of metal. In the case where there is a strong adherence of object 200 to tray 170, the bottom layers of object 200 and the tray surface may shrink by a similar amount, since the object shrinkage may be partially determined or controlled by the tray shrinkage, despite the large difference in the shrinkage coefficient of the two components. The amount that an object layer may shrink may gradually increase when the built layer is further apart from the tray. The difference in shrinkage between the bottom layers and the higher layers may therefore introduce adverse stress in the printed object, and may cause, for example, uneven dimensional errors in various parts of the object.

Reference is now made to FIG. 2C, which is a flowchart illustrating a method for improved quality printing of 3-D objects, according to some embodiments of the present invention. As can be seen with reference to FIG. 2C, the method may include, at block 22, printing a barrier layer of building material between a printing tray and an object to be printed, such that the barrier layer may separate the lower layers of the object from the tray; and, at block 23, printing the object. Other steps and/or series of steps may be used. Other steps and/or series of steps may be used.

In another embodiment of the present invention, a tray 170 may be provided that has a thermal coefficient similar to that of object 200. For example, tray 170 may be made of organic material or of the same or similar material to the object material, for example, a plastic that has a thermal coefficient similar to that of the printed layers of building material. It may be necessary, for example, for the organic material to have a low thermal conductivity. The usage of such a material for tray 170 may enable tray 170 to expand and/or contract at a rate equivalent to that of the building material, which may, for example, decrease the strain and minimize deformation due to differences in thermal tendencies.

According to some embodiments of the present invention, printing tray 170 may be warmed prior to printing of a 3-D object, to a temperature that is, for example, close to the glass transition point of the modeling and/or support materials, by, for example, a temperature control unit 204. Printing tray 170 may subsequently be allowed to gradually cool down after printing, for example, causing a controlled, gradual cooling down of the initial printed layers. In this way the cured material of the initial layers may remain for a relatively long time in near flow-able state, and may thus attain close contact with the molecular lattice of tray 170, resulting in firm adherence of the printed object to the printing tray after solidifying. In other embodiments, tray 170 may be heated before the start of printing to such a temperature that the shrink of the tray and object during and after printing due to a temperature decrease are controlled to best fit each other, for example, by shrinking to a substantially similar amount. Tray heating may be performed by temperature control unit 204.

Figure 2D:
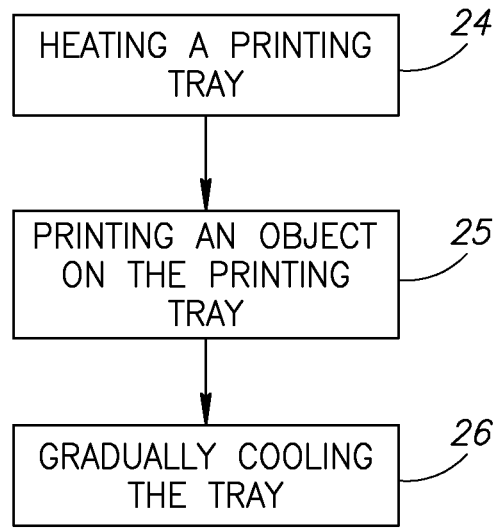

Reference is now made to FIG. 2D, which is a flowchart illustrating a method for improved quality printing of 3-D objects, according to some embodiments of the present invention. As can be seen with reference to FIG. 2D, the method may include, at block 24, heating printing tray 170, for example using temperature control unit 204, to a selected temperature, for example, such that the temperature may be substantially at the glass transition point of the modeling and/or support materials. At block 25 an object may be printed. At block 26, the tray may be gradually cooled at a selected rate, using, for example, temperature control unit 204. In such a way adhesion of the object to the tray may be enabled, and/or the respective shrinkage of the object and the tray may be controlled. Additionally or alternatively, tray 170 may be cooled using temperature control unit 204, to enable adherence of an object to tray 170. Other heating or cooling temperatures and/or mechanisms may be used. Other steps and/or series of steps may be used.

According to some embodiments of the present invention, a method of preventing and/or minimizing deformation caused by thermal inconsistencies between inner and outer parts of a printed object may be performed by constructing a 'thickening' or outer covering of support structure of a predetermined thickness around the external surface of the printed object. This covering may, for example, shield the object's external surfaces from disproportionate curing and/or uneven heating or cooling.

Figure 2E:
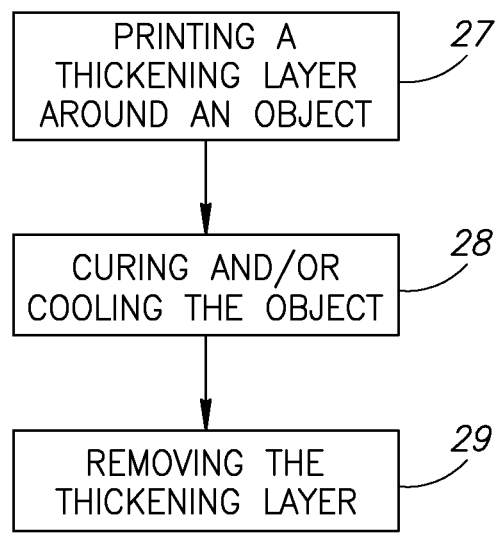

Reference is now made to FIG. 2E, which is a flowchart illustrating a method for improved quality printing of 3-D objects, according to some embodiments of the present invention. As can be seen with reference to FIG. 2E, the method may include, at block 27, printing a thickening layer of building material of a predetermined thickness around the external surface of a printed object, and, at block 28, cooling the object. Other steps and/or series of steps may be used.

Reference is now made to FIG. 3A, which is a schematic illustration of printing sub-system 180 or printing cell, which may include various printing components, according to some embodiments of the present invention. Printing sub-system 180 may include, for example, a blowing unit 330 and and/or a sucking unit 340, for respectively cooling of printing sub-system 180 by sucking hot air or other substances out of printing sub-system 180 and/or drawing cool air or other substances in to printing sub-system 180 from the surroundings. Printing tray 170 may include an adhesive surface coating 375, to enable adhesion of a printed object to tray 170. Printing sub-system 180 may include a temperature control unit 310 and/or Temperature control unit 310 may include a heating source and/or a cooling source. Heating source may include, for example, wires, heating elements and/or other suitable components. Cooling source may include, for example, wires, cooling elements, cooling tunnels, and/or other suitable components. Printing tray 170 may include one or more cooling tunnels 380. Printing sub-system 180 may include a temperature sensing unit 385, optionally associated with temperature control unit 310, to sense the temperature of cell 180, tray 170, building materials etc. Printing sub-system 180 may include an electromagnetic radiation source 315, to enable heating of the building material before, during, and/or after deposition. Printing sub-system 180 may include an electromagnetic lamp 320, for curing and/or warming of printed objects. Printing sub-system 180 may have insulation structures, for example, insulation walls 350 and/or insulation layer(s) 355. Insulation walls 350 and/or insulation layers 355 may be coated or laminated internally by an insulation coating or covering 360, for example, glossy aluminum foil or other suitable IR reflecting materials, to reflect the IR radiation. Printing sub-system 180 may have, for example, a door or opening from which printed objects may be extracted. Printing sub-system 180 may include other suitable components or combinations of components.

According to an embodiment of the present invention a method is provided to prevent and/or minimize object deformation, by printing in such a way that the printing temperature of the upper printed layers may be above, for example, the glass phase transition temperature of the materials. The temperature control unit 310 and/or. Since curing, for example UV curing, may occur at the uppermost layers of the printed object, the building material in these layers may remain in a flow-able state during, for example, the entire curing time. When contraction takes place in a liquid, the liquid may contract in a way that requires minimum energy, which in this case, for example, may cause contraction along the gravitational axis. Therefore the contraction may affect the height of the material layer (Z axis). The lower material layers may be kept below the glass transition temperature in order to prevent collapse of the object under its own weight, or due to the machine's vibrations.

According to some embodiments, higher temperatures of the upper material layers may be maintained by various means, for example, by irradiating the upper layers using a warming electromagnetic radiation source 315, heating the building material before deposition, and/or warming the upper layers by heating element 312, the heat of the exothermic chemical reaction of the curing itself, and/or any other suitable heating source. In one embodiment, a combination of preheated droplets of building materials, a strong electromagnetic lamp 320 which may include a UV wavelength required for curing, as well as visible and IR wavelengths for further warming, and/or a strong exothermic reaction, may raise and maintain the required temperature of the top layers. Other electromagnetic sources may be used.

According to some embodiments of the present invention, a method of preventing and/or minimizing deformation is provided, that may include increasing the intensity of electromagnetic radiation such that curing of each subsequent layer of building material may be completed and/or maximized prior to dispensing the subsequent layer of building material.

In cases where the temperature of the lower layers of the object and/or the object's sides may be below, for example, the glass transition point, further curing may cause shrinking of object material in the Z direction as well as in the X-Y plane, which may introduce shear stress between the various layers. According to one embodiment the lower layers may be warmed to prevent further curing of the object material, for example, using UV or other radiation that may reach the lower layers when passing through the top layers, and/or may penetrate the bare sides of the object.

Reference is now made to FIG. 3B, which is a flowchart illustrating a method for improved quality printing of 3-D objects, according to some embodiments of the present invention. As can be seen with reference to FIG. 3B, the method may include, at block 31, heating up a higher layer of building material during curing; and, at block 32, cooling the object. Other steps and/or series of steps may be used.

According to some embodiments of the present invention a method of preventing and/or minimizing deformation is provided, by lessening or minimizing thermal inconsistencies in the printed object. Such a method may include, for example, cooling each dispensed layer in turn after printing and curing, by blowing air on the top layer and/or sucking air from above the layer. Such cooling or sucking of air may be enabled, for example, by using a suitable blowing unit 330 or sucking unit 340, which may be associated with printing head 145 or otherwise situated within printing apparatus 140. The method in one embodiment may not require cooling the upper layers below the glass transition temperature, but may require cooling of the top layers, for example, such that their temperatures do not exceed too high a value above, for example, the glass transition point.

According to some embodiments of the present invention, a method of minimizing deformation is provided that includes printing with the air surrounding the object at an even temperature which may be substantially similar to the temperature of the top layers. Since the top layers may be required to be, for example, of a temperature substantially similar to the glass transition point of the cured material, a substantially similar temperature for the surrounding air and tray may be advantageous. Other suitable temperature targets may be used. For example, a warmed tray may be used to warm up the air surrounding the object during printing. For example, the printing sub-system 180 may have an insulated shield 355 and/or walls 350 to insulate printing sub-system 180, since printing sub-system 180 may be required to be warmed by IR radiation in order to prevent cooling the object. Optionally, the inside of the printing sub-system 180 may have a material that may be reflective in the IR wavelength region. According to one embodiment, the inner wall or side of the shield 360 may be laminated with, for example, glossy aluminum foil, to reflect the IR radiation. Other suitable materials may be used. An additional step in keeping the environment warm may be to avoid opening printing sub-system 180 while heating, cooling and/or curing may be taking place. Moreover, the object may be allowed to cool down slowly after printing has completed, for example, with the doors or alternative openings of the printing sub-system remaining closed, so as to maintain nearly even temperature outside and inside the object during cool down time.

During printing of an object, the layers of the building materials used may shrink within a short time interval, for example, a few seconds or tenths of seconds immediately after being laid and irradiated. Additional shrinkage may occur subsequently while cooling. When printing is paused, the shrinking before a next layer of material is dispensed may continue for longer than usual, and as a consequence a thin 'break line' or mark may be evident on the surface of the printed object. According to an embodiment of the present invention, a method of preventing and/or minimizing such 'break lines' may be provided, that may include keeping one or more layers previously deposited (before such a pause) warm, for example, by exposing the layer to warming electromagnetic radiation during such a pause, until printing of the subsequent layer resumes. Other methods of maintaining the warmth of printed layers may be used, for example, using heating element 312. Warming or other temperature control methods may have benefits other than or in addition to avoiding break lines.

In another embodiment, 'break-lines' between layers may be minimized or prevented by, for example, compensating the expected shrinkage in the Z-axis by altering the height of printing tray 170 prior to the deposition of the next layer of material after printing is resumed. For example, printing tray 170 may be lowered to print a subsequent layer, but before printing of the subsequent layer, printing tray may be slightly raised to compensate for the excess shrinkage in the previous layer. The previously laid layer may be leveled by leveler 157, and the next layer may subsequently be deposited. Since the layer thickness or height may be equal to the level of the bottom of the leveler minus the level of the top of the preceding layer, the correct layer thickness may hereby be assured. The extent to which printing tray 170 may be lowered and/or lifted may be determined according to the length of the pause in printing, and/or according to other printing parameters.

Reference is now made to FIG. 3C, which is a flowchart illustrating a method for improved quality printing of 3-D objects, according to some embodiments of the present invention. As can be seen with reference to FIG. 3C, the method may include, at block 33, depositing a layer of building material. At block 34 the material may be cured. At block 35 positioning a printing tray at a relatively high level, so as to compensate for the shrinkage in the previously printed and cured layer, the uplifting being determined in accordance with the shrinkage in the cured layer. In one embodiment the printing head may be suitably moved so as to compensate for the shrinkage in the previously printed and cured layer. Other steps and/or series of steps may be used.

After the printing process has been completed, deformation of or damage to the printed object may occur during the cooling phase of the object and/or while removing the object from printing tray 170. According to an embodiment of the present invention, a method is provided for preventing such deformations, which includes allowing the temperature of printing tray 170 and the surrounding environment (e.g., the air) to decrease slowly, before opening the printing-cell and removing the object from printing tray 170. The method may include, for example, keeping printing sub-system 180 closed during cooling, thereby cooling the printed object by natural heat loss from the object to the surrounding air, and from the surrounding air through the insulating cover of the printing apparatus to the outside environment. Forced airflow around the object should preferably be avoided to enable even and slow cooling of the printed object before its removal from printing tray 170.

According to other embodiments, a method of preventing such deformations may be performed using a removable printing tray. Accordingly, printing tray 170 may be removed from the printing area of printing apparatus 140 together with the printed object to an insulated area, within which slow cooling of the printing object may occurs, as described previously. The insulating area may be external to printing sub-system 180, and may be a moveable structure, for example, a box. The insulating area may include a shield or set of walls to prevent fast escape of heat, and a flat and open bottom. When printing is complete, an operator, for example, may open the door to the printing sub-system and place the insulating box over the tray so as to completely enclose the object, and then remove the tray and the object thus enclosed from the printing machine. In this way direct exposure of the object to the outside air may be minimized.

According to still further embodiments, a method of preventing such deformations may be performed using an insulating chamber or area situated within the printing apparatus, such that, for example, printing tray 170 bearing a printed object may be automatically moved from the printing area to the insulating chamber without necessitating opening of the printing apparatus by an operator. Such an embodiment may enable automatic continuation of the printing of a next object, once the current printing 'job' is completed and a new printing tray has been prepared. According to the current and/or previously discussed embodiment the printer may immediately resume printing of a new object using, for example, a replacement tray.

Deformation that may occur in the printing process may be caused by physical damage to the printed object when being manually removed from the printing tray on completion of printing. Such deformation may be increased, for example, when some extent of manual or mechanical force may be required in its removal.

According to another embodiment of the present invention, if the object is well adhered to a tray, for example a metal tray, the tray may be cooled, for example, by detaching the tray and submerging it in cold water or an alternative cooling source. Additionally or alternatively cold water from outside or inside printing apparatus 140 may be made to flow within channels such as cooling tunnels 380 within the base of tray 170. The difference in the thermal expansion coefficient between the thus cooled tray and the printed object may cause the object to separate easily from the tray. According to one embodiment shock waves or vibrations may be imposed on the tray during or after cooling, to accelerate the detachment of the printed object from the tray.

When a 3-D printed object cools down, the X-Y dimensions may decrease according to the object's thermal expansion coefficient. The lower part of the object which may be firmly attached to the printing tray may shrink, however, according to the thermal expansion coefficient of the tray, which may be substantially different from that of the modeling material. As a consequence the accuracy of the final X-Y dimensions at the top of the object and at the bottom of the object may differ from each other. Improved printing accuracy in the X-Y directions may be enabled by, for example, incorporating a soft pedestal between the tray and the object to enable the bottom of the object shrinking to be in accordance with the object's thermal expansion coefficient.

In an alternative embodiment, the bottom layer of the object may be modified to partly include, for example, pixels or other areas of support material, which may reduce the adherence of the object to the tray. In other embodiments the bottom layer of the object may be clear of support pixels (e.g., may preferably not include support pixels) so as to increase the adherence of the object periphery to the tray, since detaching of the object from the tray during printing may start at the periphery. The density of support pixels may be determined in such a way that the object may adhere to the tray as required, while detachment of the object from the tray after printing may still be relatively easy.

The printing of three-dimensional objects may require different types of support constructions. These may be, for example, 'support constructions' and/or "release constructions" etc., as depicted in embodiments in U.S. Pat. Nos. 6,658,314 and 6,569,373 both of which are assigned to the current assignee and incorporated herein by reference, and as described hereinabove. "Support constructions" may consist predominantly of support material that may or may not be combined with modeling material in varying ratios and combinations according to the desired strength, elasticity and so on of the support construction. Support constructions may be printed, for example, underneath and/or adjacent to the modeling construction(s), according to the purpose which the support construction(s) are to serve. "Release constructions" as described above may consist predominantly of support material, optionally combined with a relatively small proportion of modeling material, and may be deposited between the modeling construction and its adjacent support construction(s). Curing may solidify release constructions to provide, for example, a relatively soft layer of material. Such a layer may be, for example, viscous liquid, paste-like, gel-like or semi-solid to varying extents, as required, in order to ease the separation or 'release' of the support construction from the object after printing. Support and release constructions other than those described in these applications may be used.

The support and release constructions, respectively, may serve the purposes suggested by their names: 'support constructions' may be built, for example, to support parts or the whole of the object being constructed and to prevent the modeling construction from collapsing onto the printing tray. For example, where one surface of the object is constructed at a less than 90° angle, a support construction may be constructed 'underneath' this surface to support its construction. Another example may be where part of the object is constructed only from a certain Z-level (height), such as a part branching off the main body of the object or a 'lid' on top of an open object, a 'support construction' may be built up to the Z-level where construction of this part of the object begins. 'Release constructions' may for example be printed between the modeling construction and the support construction(s) to, for example, enable easy release of the support construction/s from the object. Support constructions may also serve, for example, to prevent the object being knocked by the leveling device, modify curing on the object's side walls, improve object surface quality, and reduce deformation etc.

US Patent Application Publication No. 2002/0171177 incorporated herein by reference, describes, inter alia, embodiments including various possible types of support constructions. For example, a relatively solid support structure may be formed using a skeleton, grid, or framework of modeling material or modeling construction, for example in the form of vertical pillars, bases, columns or other suitable structures, optionally joined by horizontal membranes, also of modeling material or modeling construction, around, between, and/or within which support material or support construction may be dispensed, and which structure when cured may provide a semi-solid support construction for the 3-D object being built. The thickness or width of the pillars and/or membranes and their placement and/or distances between them, may depend on the size and shape of the object being built. Other suitable support structures may be used.

Figure 4A:
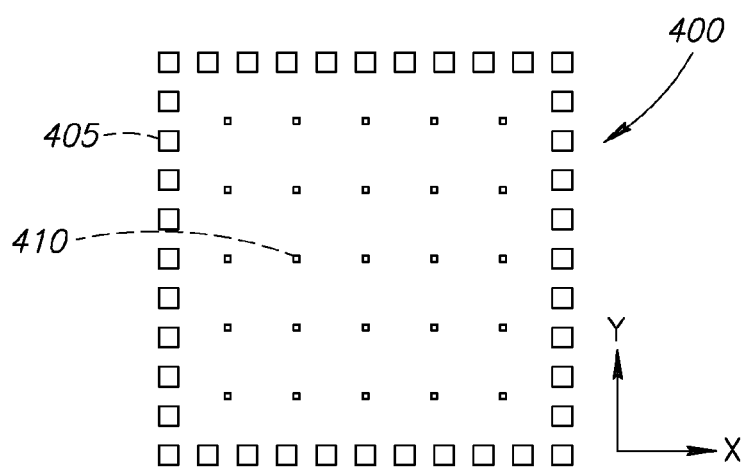
FIG. 4A is a schematic illustration of a 3-D support structure with a grid, according to an embodiment of the present invention.

Reference is now made to FIG. 4A, which is a schematic diagram illustrating a grid or skeleton of structures within a support construction, according to some embodiments of the present invention. As can be seen in FIG. 4A, support construction 400 may include a peripheral grid, for example, a skeleton of pillars and/or membranes 405, that may be, for example, substantially constructed from modeling material. Peripheral grid 405 may be larger and/or more closely spaced than the pillars and/or membranes 410 within the 'body' of support construction 400. These grid elements may provide additional strength to support construction 400. In one embodiment a peripheral grid or structure may be in the form of a thin wall of building or modeling material surrounding a support construction, to give extra strength to the support construction. For example, in cases where the support construction itself is very soft and not able to retain its own shape, e.g., when the support construction consists mainly of a certain type of support material, such a grid may be required. Grids or skeletons may include pillars, bases, columns, or other suitable structures.

Figure 4B:
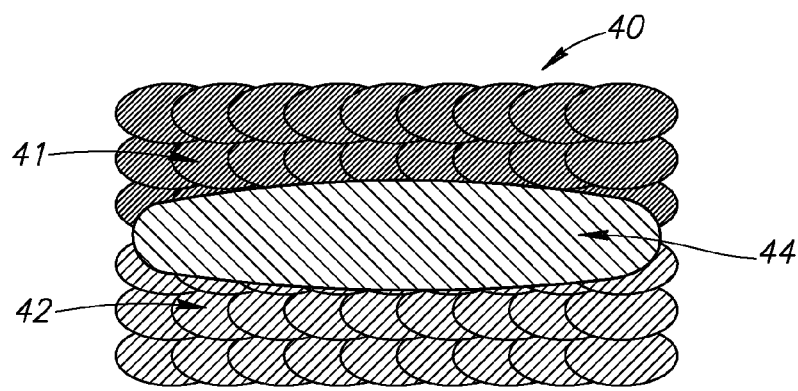
FIGS. 4B and 4C are schematic illustrations of interface lines in a printable object, according to an embodiment of the present invention.
Figure 4C:
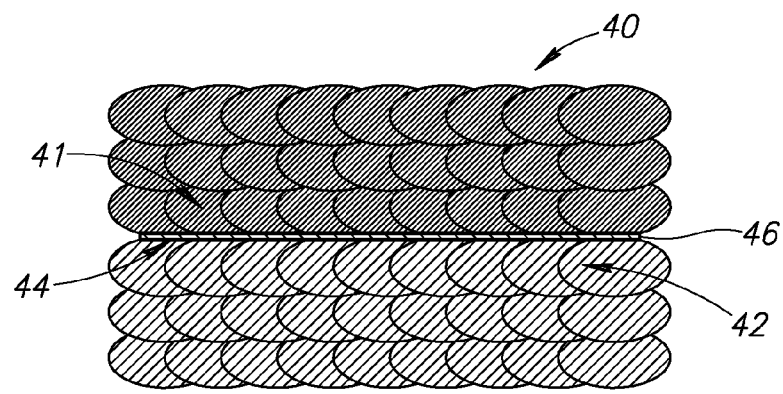

Reference is now made to FIG. 4B, which is a schematic illustration of a 3-D object 40 with adjacent support construction(s) according to some embodiments of the present invention. When building a 3-D object 40, the materials making up the modeling construction 41 and those making up the support construction 42 may tend to merge into one another where the two types of construction meet. Such a meeting of material may lead to the formation of an interface line 44. Such an interface line 44 may, for example, weaken the final object's walls and reduce the hardness and glossiness of the final object's surface Reference is now made to FIG. 4C, which is a schematic illustration of a 3-D object 40 with adjacent support construction(s) according to some embodiments of the present invention. As can be seen with reference to FIG. 4C, a "barrier' 46 may be constructed, for example, from an area of vacant pixels, where no building material may be deposited. Such a barrier 46 may be constructed between the object construction 41 and the support construction 42 to prevent merging of materials at interface line 44. Such a barrier 46 may enable absorption of materials from each construction type into the barrier 46, as opposed to the materials spreading into each other, while at the same time providing a line of separation between them. In this way, the thickness of the interference line 44 may be reduced. The size of the barrier space may vary. For example, the barrier space may be equivalent in size to a slice ranging between ¼ of to 4 times the droplet diameter, after the deposited droplet has spread to its final diameter on the printing surface (the surface of former printed layer). Other dimensions may be used.

Support constructions can be used in a number of ways to help improve the external appearance of the 3-D object and/or to prevent problems that may arise in the building of various 3-D objects. Vertical surfaces of printed 3-D objects may be of lower quality than non-vertical surfaces, for example, because part of the droplets aimed at the rim of each layer may miss the edge of the layer and fall to the tray surface or slide downward on the vertical surface of the object. Additionally or alternatively the edges at the top of the partially built object may be slightly rounded because of the surface tension characteristics of the liquid modeling material, possibly causing the top layer of the object to be shorter than as designed.

Figure 5A:
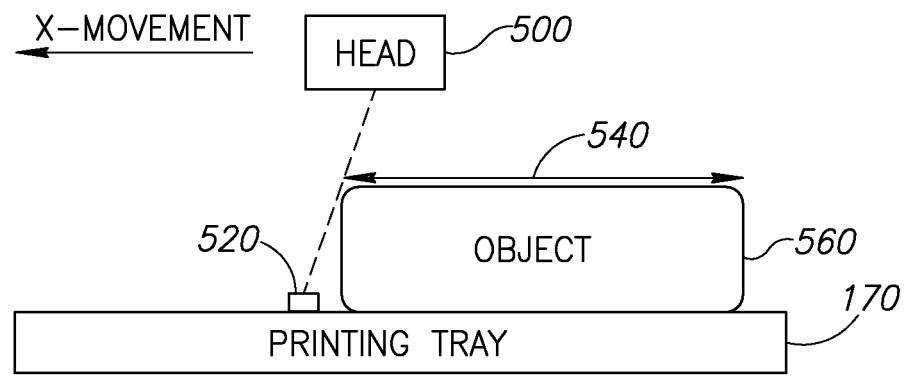
FIG. 5A is a schematic illustration of a process whereby "fallout material" is formed.

Reference is now made to FIG. 5A, which is a schematic illustration of a 3-D printing system, according to some embodiments of the present invention. As can be seen with reference to FIG. 5A, the printing head 500 may jet material 520 while moving over the printing area 540 in the main movement direction X. Therefore the building material 520 from printing head 500 may be jetted slightly off from the downward direction due to the movement of printing head 500 in the X direction. Additionally or alternatively, since the top edge of the object 560 may be rounded at the edges, the droplets of materials that are jetted just before printing head 500 leaves the object region may miss the object and be located, for example, adjacent to object 560.

Furthermore, when using some curing, systems and material at the edge of an object layer may not be cured well due, for example, to an excessive amount of oxygen diffused from the surrounding air into the material, inhibiting the curing process. In some cases the uncured material may flow down on the vertical wall and accumulate at different levels on the sides of the object, leaving shapes on the object's vertical surfaces. When the surfaces are cured the shapes that have been created on the walls may remain. Such accumulations as on the vertical surfaces and/or on the ground are herein referred to as "fallout material".

According to an embodiment of the present invention, such fallout material may be prevented or minimized by constructing a support construction, for example, an envelope, container or other suitable construction around the sides of an object (e.g., in one embodiment adding a 'thickening' layer to the vertical walls). This may be referred to as a 'thickening layer'. Such a construction may cause fallout material to accumulate on the sides of the support layer, or may cause fallout materials to be absorbed into the support layer, and not on the sides of the object itself. In this way, the accumulated fallout material may be removed from the object together with the support construction after printing. Furthermore, the supporting envelope may shield the object wall from air and may thus prevent the diffusion of possibly inhibiting oxygen, for example, into the modeling material. In this way the wall's edge may be cured more efficiently and the modeling material may be prevented from flowing down to, for example, create waves. Moreover such support envelopes or structures may reduce rounding of the top edges of the object. This may be useful, for example, when printing an object with 90° edges.

In other embodiments, thickening layers may also be used to help even the finished object surfaces. Object surfaces which are in contact with support construction during printing may have a "matte" appearance after printing has been completed and the support structure has been removed, while surfaces that were not being supported may appear more glossy. The use of a thickening layer, for example, a thin layer of support around the entire object, may also prevent the formation of visible break lines (e.g., thin protrusions) on the object surface between areas that were in contact with support construction and those that were not.

In some embodiments, a thickening layer(s) may be used to prevent roller or leveling device knocking, wherein leveling device 157 such as a roller or blade may collide with a printed object. When the leveling device enters the object area there may be a slight knocking. When the knocking is relatively strong, deformations may result, for example, thin object walls may be broken, and large areas of the printed object may be deformed, for example, may be wavy, as a result of leveling device oscillations brought about by knockings.

In general when printing, the interface material laid at the uppermost surface of the object may tend to take on a rounded shape at the edges of the object. However, this 'rounding' may be significantly more pronounced when printing thin walls and/or pins like shapes. As a consequence, the ridge or center of the thin wall may be higher than expected. Since a printing movement in the backward direction of X may be followed by leveling action of a leveling device 157, which may be attached to a printing block, for example, behind the printing head. Any leveling, however, may not follow printing movement in the forward direction, which may result in part of an object, for example, a wall ridge, being built and cured to a higher height than designed during the forward direction. As a result leveling device 157 may collide with the object wall during the backward movement. Adding a 'thickening' layer at both sides of the thin wall may prevent rounding and therefore prevent collision or knocking of the leveling device with the top of the wall.

Knocking may occur even when printing thick objects, for example, when printing thick walls that are perpendicular to the printing direction X. This may be due, for example, to movement axles that are not stiff enough. With such non-rigid axles, such very slight collisions that may unavoidably happen when the leveling device enters the object area may initiate leveling device oscillation in the Z direction. Strong oscillations may result in strong knocking. Thickening may lessen the initial collision by smoothing the pressure step function that the leveling device may "sense" when entering the object area, therefore lessening or preventing the onset of leveling device oscillations. Other sequences of movements, for example, not requiring backwards and forwards movements, may be used.

Figure 5B:
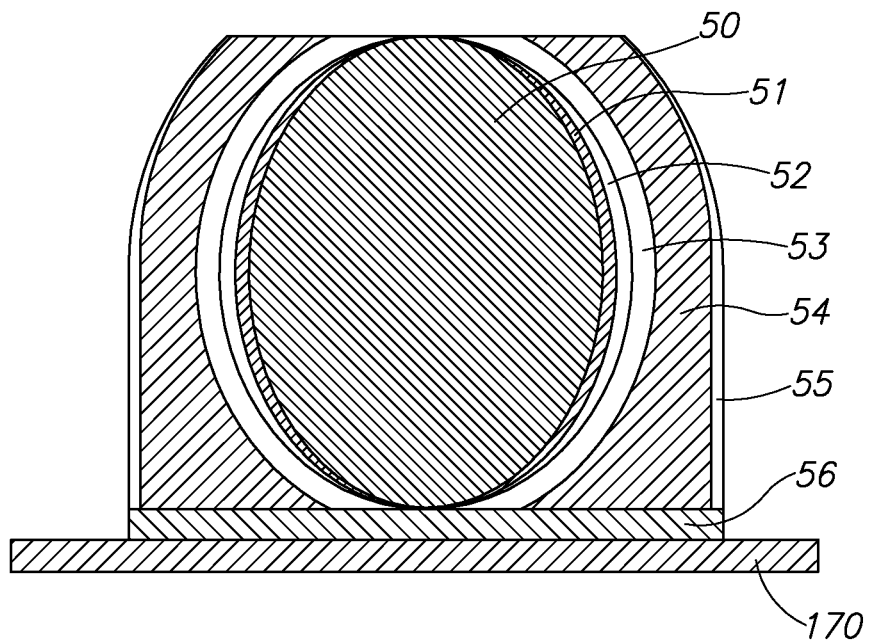
FIG. 5B is a schematic illustration of various support constructions, according to some embodiments of the present invention.

According to one embodiment, one or more support constructions may be constructed around an object, thereby providing a body outline. A body outline, as can be seen with reference to FIG. 5B may include one or more constructions or layers, in any combination. For example, an object construction 50 may be surrounded or partially surrounded by an air barrier layer 51. Air barrier layer 51 may help, for example, to prevent merging or mixing of modeling and support materials etc. A soft construction layer 52 may be built, to enable easy removal of a support construction from an object. A support construction 53 may be built, which may help in preventing a projection of coarse grid from, for example, a bulk support construction, on the object's surface. Bulk support material 54 may be dispensed as a layer or mass of material, to provide support for object construction 50 or support constructions. A peripheral support construction 55 may be built, for example, to reinforce support construction 54. Such a peripheral support construction 55 may enable provision of sufficient support for object 50, possibly at a minimal cost, and enabling easy support removal. A pedestal support construction 56 may be built, which may act like a buffer between the printing tray 170 and object 50. Pedestal support construction 56 may help prevent deformation, by, for example, decreasing the difference of scale accuracy between the bottom and upper sides of object 50, helping ease detachment of object 50 from tray 170, and/or helping enable accurate leveling of the lower layers of object 50 by leveler 157. One or more of the above described support constructions may enable, for example, separation of printed object 50 from the tray, separation of printed object 50 from its support constructions, and/or reinforcement of the object construction.

In one embodiment, a body outline, which may be a reinforced layer constructed around a printed object, may be constructed within a support construction. A support construction may include a number of body outlines. For example, one body outline may surround a second body outline, or may be located in any other suitable location relative to one or more other body outlines. A body outline may, for example, include a grid or other suitable support constructions. Each such body outline may or may not have a different grid. For example, a first body outline adjacent to an object construction may be a thin layer of support material or another suitable support material. For example, a layer of approximately 500 microns or other suitable dimensions may be used. Surrounding this first body outline, a second, optionally thicker body outline may be constructed, for example about 3 mm thick or having other suitable dimensions. Third, fourth, fifth etc. types of body outlines may be subsequently constructed. Each body outline may serve a purpose in improving construction, quality and/or appearance of a printed object. For example, the first body outline may enable separation of the object from the support constructions. The second body outline may, for example, produce a uniform surface, which may used to provide required object-surface quality. The third body outline may, for example, be constructed using a relatively high modeling material to support material ratio, therefore providing a more solid or rigid building matrix. This third body outline, for example, may or may not be thicker than the second outline type. The fourth body outline, for example, may include a relatively soft grid, and may facilitate removal of large masses of support material. Other types of body outlines or combinations of body outlines may be used.

Taking into account the possible advantages of each type of body outline, different objects may require different kinds of body outlines. For example, an object requiring a larger mass of support may benefit from further body outlines. For example, a ring approximately 10 mm high may benefit from body outlines 1, 2 and perhaps 3. For example, a cellular phone approximately 20 mm high may benefit from body outlines 1, 2, 3 and 4. Preferable combinations of body outlines may be determined according to the object being built and the relative advantages and disadvantages of each type and/or combination of body outlines.

Figure 6A:
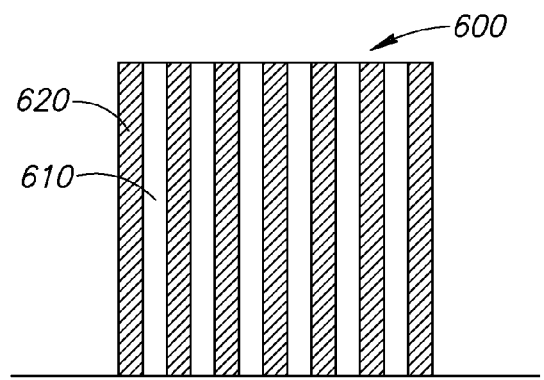
FIGS. 6A-6D are schematic illustrations of support grids used for printable objects, according to some embodiments of the present invention.

Reference is now made to FIG. 6A, which is a schematic diagram illustrating a grid construction 600 that may be implemented as, for example, a "support construction", according to some embodiments of the present invention. Such a grid construction 600 may be defined as a construction that may include support material reinforced by discrete modeling material elements or areas. For example, a grid construction 600 may be constructed by constructing one or more continuous support material layers 610 that may be reinforced by one or more continuous columns, bars, or pillars of modeling material 620. This kind of support construction, which may include continuous modeling material areas, is herein referred to as a "Normal continuous grid". The CAD software, for example, which may provide instruction to printing system 100 to construct grid constructions, may enable construction of various types and forms of grids, for example, "body outline grids", "multiple grid designs", and "contacting grids" etc., as are described in detail below. Such additional grid improvements may be generally referred to herein as "smart grids". The various methods and structures describe herein may be affected by a system controller 105 associated with software 120.

According to an embodiment of the present invention, a multiple grid type support construction may be constructed by defining, for example, grid widths (e.g., GRID WIDTH1) for X, Y and/or Z-axes, and grid spaces (e.g., GRID STEP1). These definitions may produce, for example, a continuous area of support material reinforced by a continuous or non-continuous grid constructed from modeling material. GRID Step 1 may, for example, be defined as the distance (in each one of the 3 axes) between modeling grids as defined by GRID WIDTH1, where GRID WIDTH1 may define the dimension (in each axis X, Y and Z) of the reinforcing modeling elements included in the support construction.

Figure 6B:
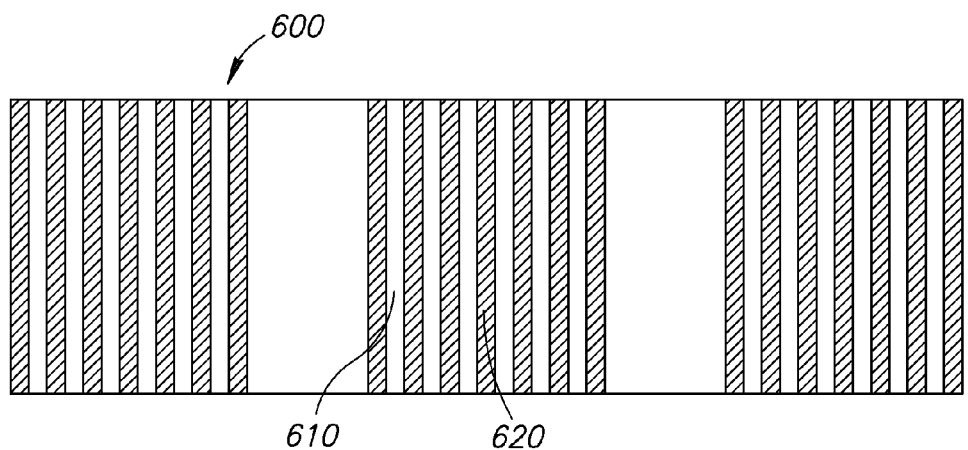

Reference is now made to FIG. 6B, which is a schematic illustration of a grid construction, according to an embodiment of the present invention. As can be seen with reference to FIG. 6B a second definition, including for example, GRID STEP2 and GRID WIDTH2 for X, Y and Z may be defined. Such a definition may be applied to grid construction 600 resulting from the modeling grids defined by GRID STEP1 and GRID WIDTH1. The definitions of, for example, GRID STEP2 and GRID WIDTH2 may produce, for example, a continuous medium made of support material between the grids, and a non-continuous modeling grid made of the resulting grid as defined by GRID STEP2 and GRID WIDTH2. In this way, each grid (e.g., reinforcing element) defined by GRID STEP2 and GRID WIDTH2 may be constructed from a grid mass as defined by GRID WIDTH1 and GRID WIDTH2. In some embodiments GRID STEP1 may be thinner than GRID STEP2, as each grid defined by GRID STEP2 may include the resulting supporting construction formed by GRID STEP1. In some embodiments GRID WIDTH1 may be smaller than GRID WIDTH2, as each grid defined by GRID WIDTH2 may include the resulting supporting construction formed by GRID WIDTH1.

Such a grid, as described above (e.g., with non-continuous modeling elements), may enable the definition of "X", "Y" and "Z" modeling grid dimensions (e.g., GRID WIDTH), as well as the "X", "Y" and "Z" distances between modeling grids (e.g., GRID STEP). In one embodiment Z-step may equal zero, which may result in the grid including continuous modeling columns (see FIGS. 6A and 6B). In another embodiment, as can be seen with reference to FIG. 6C, Z-step may not be zero, which may resulting in non-continuous grid columns, with at least one gap 630 between grid columns Directions "X", "Y" and "Z" are used by way of example. Other suitable directions or direction variables may be used.

Figure 6C:
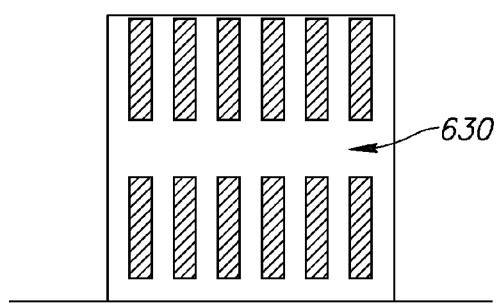
Figure 6D:
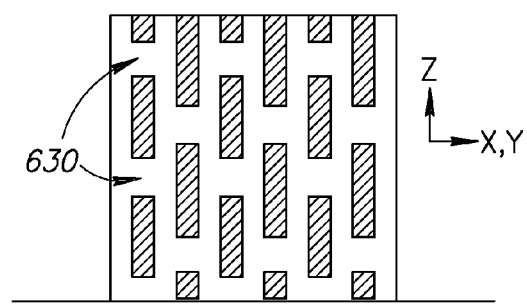
Figure 6E:
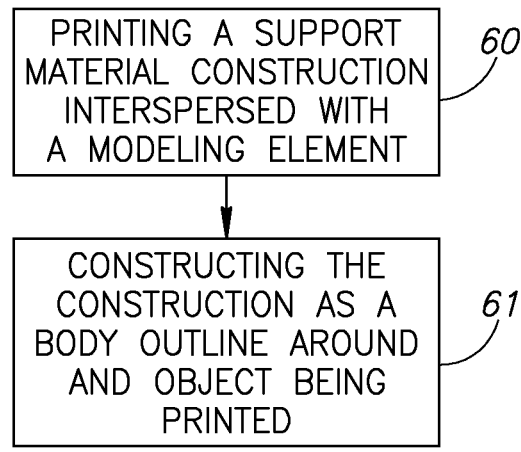
FIG. 6E is a flow chart illustration of an exemplary method of printing, according to an embodiment of the present invention.

In another embodiment, the gap 630 between modeling grid elements (e.g., sticks and columns), which are referred to herein as "Modeling Grid break", may not necessarily occur at the same locations for the various modeling elements. Such a case may result in a grid construction that may include a non-continuous grid, where each grid line may have gaps or grid breaks 630 at different locations, as can be seen with reference to FIG. 6D. For example, a normal non-continuous grid as illustrated in FIG. 6C may produce a weaker Z-axis support construction than the continuous grid illustrated in FIG. 6A. However the Z-axis support construction of FIG. 6C may produce a stronger Z-axis support construction than the non-continuous Grid illustrated in FIG. 6D. A non-continuous grid, such as the grid illustrated in FIG. 6D, may provide stronger X and Y-axis support, for example, than the normal non-continuous grid of FIG. 6C, by, for example, assuring that a modeling grid break does not form at the same locations in the various modeling material elements. A non-continuous smart type of Grid may result, for example, in an improvement in support removal, compared to the normal continuous type of grid. In other embodiments the diameter of the modeling grid elements may be increased without substantially negatively effecting the support removal from a printed object and without substantially negatively affecting support removal properties.

It should be noted that when used herein the X, Y and Z directions may be relative to each other, and need not be absolute, and further the use of descriptions of movement in these directions is by example only, and other movement patterns and schemes are possible. Further, some embodiments described herein include a print head or other equipment having a certain movement pattern (e.g., forward and backwards, etc), or a certain timing pattern of movement relative to jetting, curing, etc. These movement and timing patterns are shown by way of example only. Other suitable movement and timing patterns may be used.

In another embodiment, a further definition, including for example, GRID STEP3 and GRID WIDTH3 for X and Y may be defined. Such a grid may, for example, be constructed so as to transcend the body outline and make contact with the printed object itself. In this way, for example, such a grid may impart to the printed object high adhesion of the entire support construction. Usage of such grid constructions may help in eliminating or significantly reducing the possibility of the modeling construction being separated from the support construction(s) during or after printing. For example, the grid Width definition and the grid gap definition may be significantly increased (e.g., GRID Width 3-1, GRID Step 3-1) at a grid base, to cover an area that may come into contact with the printing tray. Grid width definition may be significantly decreased (e.g., GRID Width 3-2), at a grid end, to cover an area that may come into contact with the object, to enable relatively easy release from the object. Additionally, between, for example, GRID WIDTHs 3-1 and 3-2, the column (GRID) dimension may gradually be changed, for example, the grid column may taper, thereby narrowing significantly towards the end of the grid, where the grid meets the object. Other suitable grid definitions or combinations of grid definitions may be provided.

Inaccuracies and/or imperfections in the final printed 3D object or model may occur for a number of reasons. Even if the inaccuracy is minimal, the error may have serious consequences for example, when two or more parts are designed to fit together, a slight inaccuracy renders this impossible. According to some embodiments of the present invention, in order to limit the inaccuracy to a proportion acceptable in the art, e.g. 0.2 mm, or even smaller proportions, modifications may be introduced to the configured data (for example the STL file) taking into account the parameters of printing apparatus 140, the printing process and the building materials being used.

Imperfections in 3-D printed objects may occur for example, when one or more nozzles 147 on printing head 145 are wholly or partially blocked, defective or non-functional. According to some embodiments of the present invention, if these problematic nozzles remain non-functional even after purging or other treatment, they may be defined in the apparatus controller 105 as "missing nozzles", which may be compensated for during the printing process. An apparatus and method of detecting such "missing nozzles" is described and exemplified in PCT Application Number PCT/IL03/00746, filed Sep. 11, 2003, titled "APPARATUS AND METHOD FOR CALIBRATION IN THREE-DIMENSIONAL MODEL PRINTING", of the same Assignees, which is incorporated herein by reference in its entirety.

In one embodiment the effect of missing nozzles may be spread over a greater area by, for example, shifting printing head 145, for example, in the Y-direction between printing cycles. The range of shift may need to be wide enough to be effective in compensating for the printing lack caused by missing and/or defective nozzles, but still small enough to prevent significant errors in drop deposit placement due to 'linearity' errors in the Y-axis. Other types of shifting may be used, and in other directions. Random shifts (e.g., within a predefined shift range) may be made in between layers or within layers (e.g., in the reverse direction of the printing head). By using such shifting of printing head 145, and by taking into account the design of the object as defined in the data (e.g., CAD, COD or STL file etc.) and a map of missing nozzles as defined in the data, printing apparatus 140 may avoid printing two or more successive layers with missing nozzles in the same location. In the case where a group of missing nozzles exists, special compensation steps may be taken, for example, defining a shift algorithm to overcome the lack in a specified area of printing head 145.

For example, the printing head may be shifted between passes to prevent full or partial overlap of, for example, the Y location of a the group of missing nozzles in two or more consecutive layers. If a missing group of nozzles is located at one of the two end points of the printing head movement, for example, the effective size (length) of the head may be reduced by excluding a portion of the end from participating in printing. The system controller 105 may for example calculate print data using a smaller-sized printing head, and/or omitting missing or malfunctioning nozzles. In such cases, each layer may be printed twice or more, for example, where the printing head is shifted in the second or subsequent prints from the first, in such a way that the missing groups may not overlap in successive prints.

In another example, missing nozzles may be compensated for by using a system of 'back interlacing'. Controller 105 may, for example, introduce a shift of printing head 145, for example, in the Y direction before its backward/reverse passage over the printing area in the X axis, taking into account the map of missing nozzles defined in the STL file, to compensate for missed pixels in the object. Controller 105 may use or calculate adjustment parameters, including for example, various dimensional adjustments, shifting of the print head, alterations to print head movement, and/or alterations in the way that the input data may be converted, to print data.

According to some embodiments of the present invention a number of adjustments to the X, Y and/or Z-axes may be configured in the STL file or other suitable data file, to help achieve a higher quality product, both in strength and in appearance. In one embodiment higher resolution of each printed layer may be obtained by 'interlacing' successive layers of building material. For example, slight adjustments may be made to the printing head's positioning in the X and Y-axes at each new Z level, such that drops of building material may fall 'in between' drops deposited in the previous forwards/backwards motions of the printing head, thus interlacing layers of building material. In one embodiment, the interlacing may involve, or may be the functional equivalent to, printing a layer where the printing head has a certain reference frame (e.g., starting coordinate); and printing a second layer with a second reference frame, the second reference frame being different from the first reference frame. Any suitable number of subsequent layers may be printed, each layer having a reference frame that may or may not be similar to other reference frames. For example, the reference frames may be shifted slightly, and in the case where two or more such layers are printed, the reference frames may be repeated.

In another embodiment, higher resolution may be obtained by sending different information to the printing head for each Z-movement of the printing head. Whereas the forward and backward movements (e.g., X and Y movements) of the printing head are usually at the same Z height, an adjustment may be made in the Z-axis prior to the reverse passage of the printing head such that the layer deposited during the reverse passage may be slightly removed in the X, Y and/or Z axes to, for example, further increase accuracy of the printing object. This embodiment may be especially practicable when printing an object that may be curved in shape in the Z-direction.

Figure 7A:
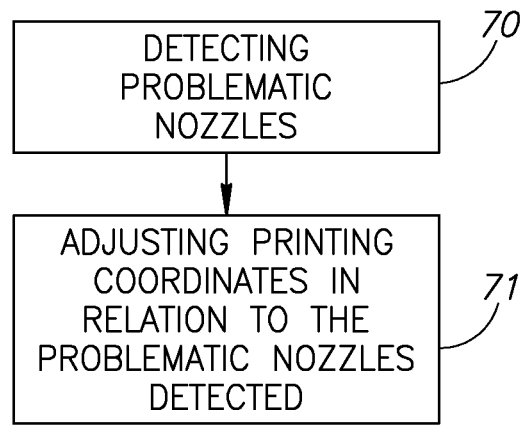
FIG. 7A is a flow chart illustration of an exemplary method of printing, according to an embodiment of the present invention.

Reference is now made to FIG. 7A, which is a flowchart illustrating a method for 3-D object printing that may enable compensation for non-functional or problematic nozzles, according to an embodiment of the present invention. As can be seen with reference to FIG. 7A, the method may include, at block 70 detecting problematic nozzles. For example, a nozzle test procedure may be executed periodically or randomly, in which, for example, the printing head may be operated for one layer and a test series, for example, a series of small bars, may be printed for each nozzle. An operator or nozzle detector unit may detect missing or problematic nozzles by checking the printout. Such a printout may be done on tray 170, on a paper sheet attached to tray 170, or on another suitable medium. The data indicating the status of nozzles may be processed by controller 105, and, at block 705 the printing coordinates for the object to be printed may be adjusted, to compensate for the problematic nozzles. Other steps and/or series of steps may be used.

Figure 7B:
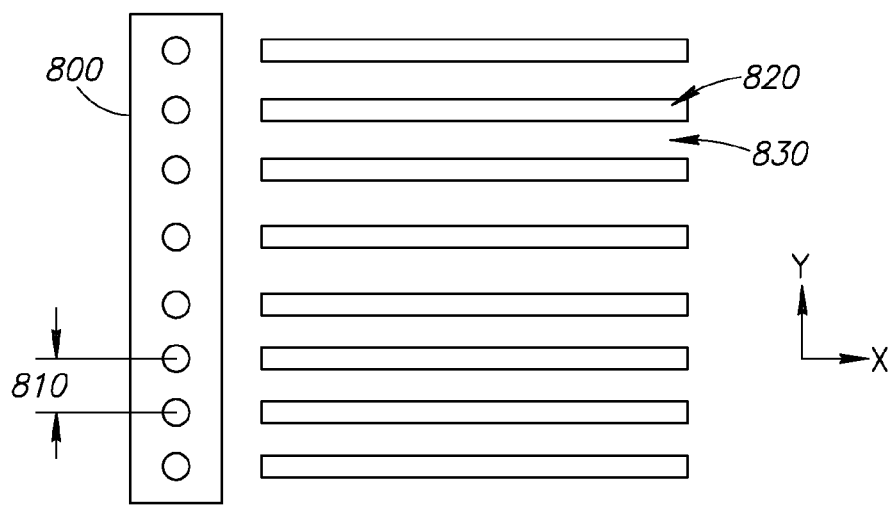
FIGS. 7B-7E are schematic illustrations of higher print resolution procedures according to some embodiments of the present invention.

Reference is now made to FIG. 7B, which is a schematic illustration of a printing apparatus, according to an embodiment of the present invention. In cases where printing is executed with a nozzle array 800 with a large nozzle step, for example, where the space 810 in between nozzles is larger than the droplet diameter, gaps 830 may be evident between the tracks 820 of deposited material, which may cause the surface(s) of the object to be uneven in texture or 'finish', e.g., stripe-like tracks may be apparent on the surface of the printed object. According to an embodiment of the present invention, such gaps 830 between tracks of deposited material 820 that may be evident after, for example, a first X printing motion, may be filled by shifting the nozzle array 800, for example, by a half-nozzle step in the Y direction before a next X complementary printing motion. For example, if the first motion is in forward X direction, the second may be in backward X, and vice versa. If two complementary X motions, as described above, are not sufficient for filling the gaps between printing tracks, more complementary X motions may be used, optionally with smaller Y shifts between each. For example, 3 motions with a ⅓-nozzle step shift, or 4 motions with a ¼ nozzle step shift, etc., may be used in the same layer. Since the nozzles may differ from each other in their intensity, and some of the nozzles may be "dead", lines of high and low accumulated material, or areas of missing material may be formed. According to one embodiment, the Y location of the head (or nozzle array) may be toggled between the different printing movements in the X direction. For example, random Y shifts may be executed, or non-random shifts, as determined by controller software 120. This procedure is herein referred to as "nozzle scatter". In this way a Y shift associated with "nozzle scatter" may be used in order to improve uniformity of the printed surface and compensation for missing nozzles.

Figure 7C:
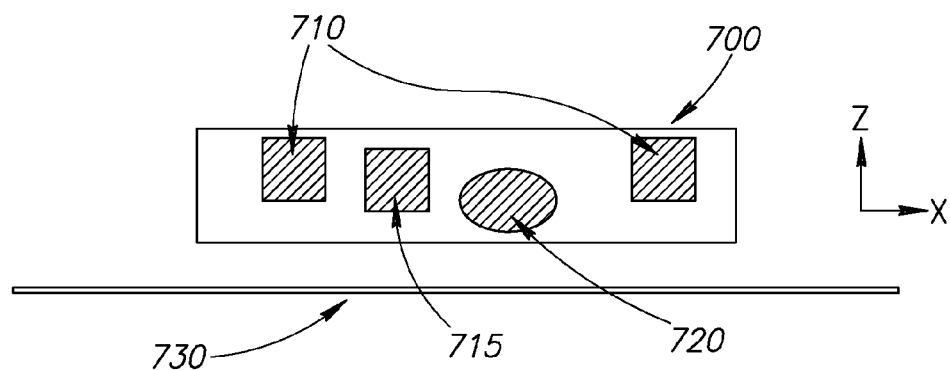

Reference is now made to FIG. 7C, which is a schematic illustration of a printing apparatus according to some embodiments of the present invention. A printing block 700 may include one or more curing sources 710, for example, UV lamps. A leveler 720, for example, a leveling roller, may be designed in a way that it may only operate on the printing material before solidification of the material. Since leveler 720 may be located on the right side of jetting head or nozzle array 715, in the illustrated example, the leveler may only be enabled to touch the material layer when an X motion of the head is from right to left. Therefore, in order to assure that the roller does not touch the layer during an X movement from left to right, a minor downward correction of the height position of tray 730 may be performed before an X motion from left to right, for example, 100μ downward. It should be noted that the notions "X and Y motions of the head assembly" may refer to motions relative to tray 730. Therefore X motion to the left may be done by moving tray 730 to the right in respect to the axes of earth while jetting head 715 is stationary, etc. The same principal may refer to Z height or motion of the tray, which may refer to the height or motion of the tray relatively to head 715 position or motion. In another embodiment the size of the resolution pixels in the Y direction may be set equal to Y nozzle step or the Y minimal step between the X movements comprising a slice (e.g., half-nozzle step or third or quarter steps, etc. as described above).

According to a further embodiment, since some nozzles may not be functioning at a given time, a procedure of shifting the nozzle array in the Y direction by whole multiples of the nozzle step from one complementary X motion to another may be added onto the shifts of parts of a nozzle step. A shifting algorithm that may be used may be similar or the same as that used between adjacent slices in, for example, U.S. Pat. No. 6,259,962, of the same assignees and which is incorporated herein by reference.

In some cases printing a slice using more than two complementary X printing motions may cause a collision of the leveling device 157 with the object. This is because the tracks that are formed during an X movement from left to right be solidified before being leveled by the roller. In one embodiment this phenomenon may be prevented by including two leveling devices, one on each side of the printing head array. In an additional embodiment the apparatus may include only one curing lamp, located at a side of the leveling device (see FIG. 7C). In one embodiment, when an even number of X printing motions may be required, the first movement may be a backward movement, for example, from right to left. In all the subsequent forward movements, for example, left to right movements, except for the last left to right movement, material may be injected on tracks that are not touching their neighboring tracks. During the backward movements (except for the first backwards movement) material may be injected on tracks that touch their neighboring tracks on each Y side. The tracks that touch neighboring tracks may protrude higher than the roller height in Z. Since these are only the backward tracks, the roller can level up these tracks before they solidify, and collisions may be prevented.

Figure 7D:
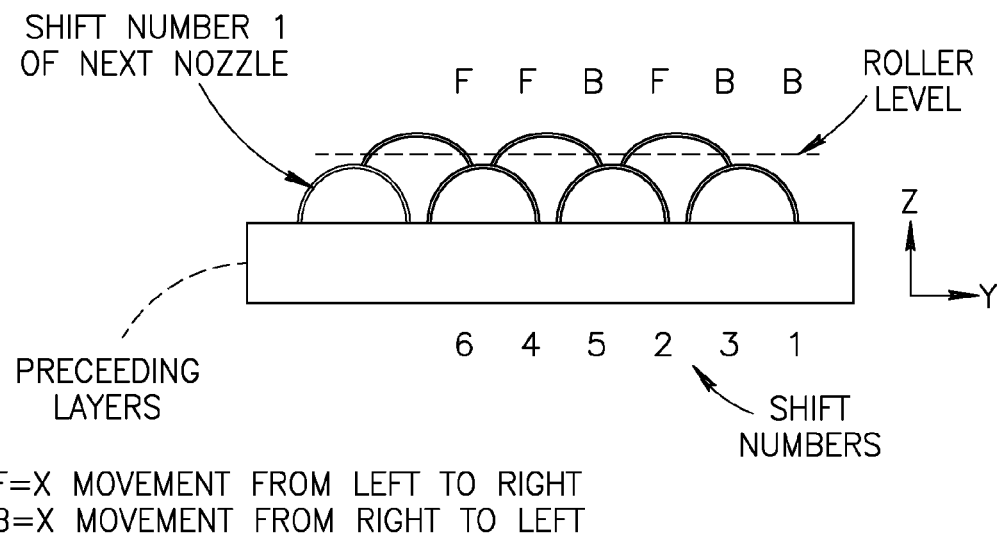
Figure 7E:
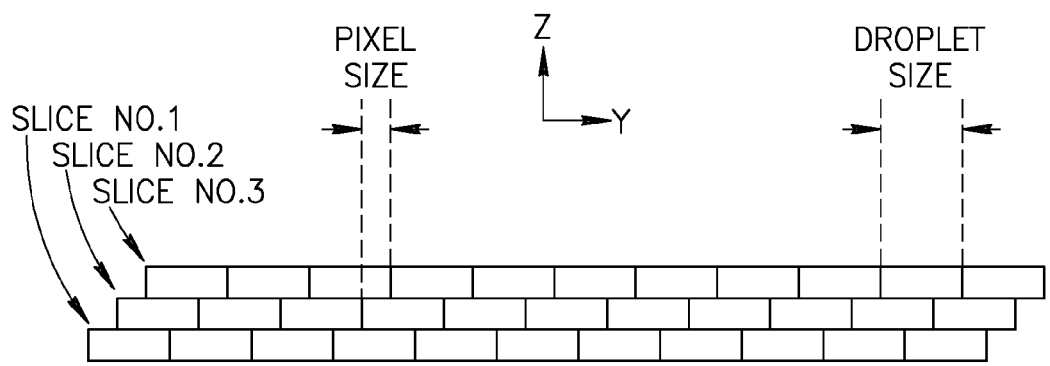

An embodiment of this invention is illustrated in FIG. 7D. Profiles of 6 tracks (in a case of 6 Y shifts, for example), corresponding to an i-th nozzle are shown in a Y-Z cross sectional view. As can be seen in FIG. 7D, every time that a track is built higher than the roller height, the track may be printed during a backward movement, and therefore the leveler may easily level up the building material. The numbers in the figure indicate the temporal order of track printing; B and F stand for Forward and Backward The droplet diameter d may set an upper limit on the possible resolution $r_y$ in Y direction that can be achieved while printing a slice, namely $r_y=1/d$. According to an embodiment of the present invention, higher resolution may be provided in the Y direction. As can be seen with reference to FIG. 7E, when higher resolution in Y is required, a combination of two or more consecutive slices or layers may be used. In the first slice only part of the pixels set by the higher resolution may be printed. An additional part of the pixels may be printed on the second slice, and so on.

For example if the required resolution is 3 times larger than 1/d, 3 slices may be used in a way that the first slice prints, for example, 1, 4, 7, 10, 13 . . . series of successive pixels, the second prints 2, 5, 8, 11, 14, . . . and the third prints 3, 6, 9, 12, 15, . . . series. In each slice the content of the high-resolution pixel map may differ from the former slice according to the change of Z (the axis in the height direction). The grid of pixel locations, however, may preferably be kept constant in respect to the X-Y start point. Because of the small slice thickness, the result of such printing may be very close to the result of true high-resolution printing. This method may enable, for example, high resolution printing, but using a smaller data file than otherwise would be required to obtain the same result.

It should be noted that the various methods and structures described herein may be effected by a suitable 3-D printer and a controlling unit possibly in conjunction with software and/or hardware elements, such as for example, controller 105, printing apparatus 140 and the various associated components described in FIGS. 1, 2A and 3A, but may be effected by other suitable 3-D printing software and/or apparatuses having other functionalities and structures.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

The invention claimed is:

1. A method for printing a three-dimensional object comprising:
    depositing from an inkjet printing head ultraviolet-curable (UV-curable) photopolymer liquid building material in layers onto a printing tray; and
    repeatedly radiating UV radiation toward the printing tray to cure and solidify the deposited ultraviolet-curable (UV-curable) photopolymer liquid while controlling temperature of upper deposited layers, the printing tray and surrounding air to above the glass transition temperature of the cured UV-curable photopolymer building material.

2. The method of claim 1 comprising:
    heating the printing tray to above and near the glass transition temperature of the cured UV-curable photopolymer building material.

3. The method of claim 1, wherein controlling temperature of the upper deposited layers comprises operating heating elements according to reading received from a temperature sensor.

4. The method of claim 1, wherein controlling temperature of the upper deposited layers comprises operating cooling elements according to reading received from a temperature sensor.

* * * * *